(12) United States Patent
Hongo

(10) Patent No.: US 6,555,364 B2
(45) Date of Patent: Apr. 29, 2003

(54) BIOLOGICAL DEODORIZING APPARATUS ASSEMBLED WITH BOX-LIKE FRAME UNITS

(75) Inventor: Kenjiro Hongo, Tokyo (JP)

(73) Assignee: Sankyo Kogyo Co., Ltd., Tokyo (JP)

(*) Notice: Subject to any disclaimer, the term of this patent is extended or adjusted under 35 U.S.C. 154(b) by 0 days.

(21) Appl. No.: 09/887,814

(22) Filed: Jun. 22, 2001

(65) Prior Publication Data

US 2002/0155593 A1 Oct. 24, 2002

(30) Foreign Application Priority Data

Feb. 21, 2001 (JP) .................................... 2001-044490

(51) Int. Cl.[7] .............................................. C12M 1/12
(52) U.S. Cl. ................ 435/297.1; 435/266; 435/299.1; 55/492; 55/495
(58) Field of Search .......................... 435/209.1, 266, 435/297.1, 297.2, 299.1; 55/490, 492, 494, 495

(56) References Cited

U.S. PATENT DOCUMENTS

| | | | | |
|---|---|---|---|---|
| 4,421,534 A | * | 12/1983 | Walker | ....................... 210/150 |
| 4,723,968 A | * | 2/1988 | Schippert et al. | ........... 210/151 |
| 4,734,111 A | * | 3/1988 | Hoffmann et al. | .......... 435/262 |
| 5,518,920 A | * | 5/1996 | Stewart et al. | .............. 435/266 |
| 6,168,711 B1 | * | 1/2001 | Teramachi et al. | .......... 210/123 |
| 6,194,198 B1 | * | 2/2001 | Koers | ......................... 210/150 |

* cited by examiner

Primary Examiner—David A. Redding
(74) Attorney, Agent, or Firm—Koda & Androlia

(57) ABSTRACT

It is biological deodorizing apparatus that has an inlet portion (1), a treating portion (2) and an outlet portion (3) in a series, and biologically deodorizes gas in said treating portion. Each of frames of said portions is composed of one or more rectangular hexahedron box-like frame units (6) constructed by connecting frame members (4) and joints (5). The treating portion is constructed containing cartridges (11) being set by several porous plastic sheets (10) in parallel with each other at a distance can be pulled out free in horizontal direction. The treating portion's blow-off surfaces (13) is connected to lower located blow-in surfaces (14) of the outlet portion in airtight condition, and open surfaces (15) are sealed with seal panels (16). Water is supplied to upper portion of said treating portion, and drained off through bottom portion.

23 Claims, 21 Drawing Sheets

BIOLOGICAL DEODORIZING APPARATUS ASSEMBLED WITH BOX-LIKE FRAME UNITS

BACKGROUND OF THE INVENTION

1. Field of the Invention

This invention relates to a Biological deodorizing apparatus assembled with box-like frame units, especially to a deodorizing apparatus which can be easily constructed in suitable size according to amount and characteristics of gas to be treated and space where to be installed.

2. Prior Art

Typical malodorous materials causes at a sewage treatment place are these three types, ammonia, hydrogen sulfide, and organic sulfuric compound (methyl mercaptane, methyl sulfide, methyl disulfide), and objective of deodorizing is to reduce these malodorous materials to the density where they are not perceived as odor.

In Japan, threshold densities and regulation bases are stated for 22 types of material in prevent odor low by the ministry of environment. Regarding to odor causes at a sewage treatment place, hydrogen sulfide, methyl mercaptane, methyl sulfide, methyl disulfide, ammonia, and trimetylamine, are mainly considered, so that designing targets of a deodorizing apparatus are settled at those 6 materials. However, in practice, trimetylamine is hardly detected and designing targets are settled at rest 5 materials.

Odor is multiple smell of these 5 materials, and removing odor means reducing these 5 materials to the density where they are not perceived as odor.

Because the extent of odor deeply relates to the sensing level of human (threshold), threshold densities and regulation bases for 5 material are stated in prevent odor low by the ministry of environment as shown in below table. 1.

TABLE 1

| | | (ppm) | | | |
|---|---|---|---|---|---|
| Odor intensity | Hydrogen sulfide | Methyl mercaptane | Methyl sulfide | Methyl disulfide | Ammonia |
| 1 | 0.0005 | 0.0001 | 0.0001 | 0.0003 | 0.1 |
| 2 | 0.006 | 0.0007 | 0.002 | 0.003 | 0.6 |
| 2.5 | 0.02 | 0.002 | 0.01 | 0.009 | 1 |
| 3 | 0.06 | 0.004 | 0.05 | 0.03 | 2 |
| 3.5 | 0.2 | 0.01 | 0.2 | 0.1 | 5 |
| 4 | 0.7 | 0.03 | 0.8 | 0.3 | 10 |
| 5 | 8 | 0.2 | 2 | 3 | 40 |

The odor intensity is described as follow.
1—Smell which can be perceived with difficulty (sensing threshold.)
2—Tiny smell which can be distinguished as what smell is (recognizing threshold.)
2.5—To make the density below the value shown in above table become regulated base in residential area.
3—Smell which can be perceived easily.
3.5—To make the density below the value shown in above table become regulated base in industrial area.
4—Strong smell.
5—heavy smell.

The odor intensity 2.5 regulated as base in residential corresponds to odor density 300 (density which can't be perceived by being diluted to 300 times of volume). Though the odor intensity 4 and 5 is out of question because of being awful odor, in the case where odor intensity exceeds 3, a complaint about odor is always made by residents. Therefore, the deodorizing apparatus is required having capacity to remove the smell to the level below smell intensity 2.5.

At the present time, ordinary methods used for deodorizing apparatuses installed at sewage treatment places are washing by liquid chemicals and absorbing by activated carbon, then these methods have left a lot of results and been evaluated properly. However these two methods have some problems as described below.

(1) The Method of Washing by Liquid Chemicals

The method of washing by liquid chemicals requires daily maintenance of medical density of washing liquid and has many problems about maintenance such that solid material (blocking material) suddenly causes in abnormal reaction between odor material and liquid chemicals in the case where the maintenance is failed. Ordinary, as seen that activated carbon devices are always installed (follows as later treating) behind the method of washing by liquid chemicals, it is guessed that the method of washing by liquid chemicals is low reliable and unstable. Further, demand of liquid chemicals increases in proportional to gas amount and odor material density, and maintenance cost is not negligible. Furthermore, in the method of washing by liquid chemicals, because portion of washing recycling liquid must be replaced, there is a problem that treatment of replaced waste liquid including the replaced liquid chemicals must be considered as a part of equipment.

(2) The Method of Absorbing by Activated Carbon

On the other hand, the method of absorbing by activated carbon is suitable for deodorizing low density odor. However, because it absorbs odor physically, all of activated carbon must be replaced with new one when it is saturated. The cost also, similar to the liquid chemicals, increases in proportional to the gas amount and the odor material density, and the maintenance cost becomes heavy burden.

(3) The Method of Biological Deodorizing

These years, research and development about biological deodorizing uses physiological function of absorbing malodorous materials by living organisms are prosperous, and it is verified by actual apparatus that living organisms are superior to remove malodorous materials such as hydrogen sulfide or organic sulfuric compounds cause at the sewage treatment place. Then it is to be recognized that the biological deodorizing is effective.

Comparing to the conventional methods of washing by liquid chemicals or absorbing by activated carbon, the deodorizing apparatus applying physiological metabolism by which microorganisms absorb malodorous materials does not require cost for chemicals and activated carbon either cost for maintenance such as labors cost for supplying medical liquid or replacing activated carbon, and is maintenance free and environmentally harmless apparatus. Further, comparing to the methods of washing by liquid chemicals and absorbing by activated carbon being inferior to treat high density gas, the microorganisms can work well in high density, and naturally be expected to be alternative. Deodorizing in future is, in spite of density or amount of treating gas, seems to be entrusted to biological deodorizing one by one at all.

However, deodorizing rate of living organism is extremely slower than washing by liquid chemicals or absorbing by activated carbon and the apparatus needs to be 2.5 times as large as washing by liquid chemicals or 1.5 times as large as activated carbon device. Most of current apparatus is sized at each of designing according to treating gas amount and odor material density, and then constructed by hand at the construction site.

Ordinary, deodorizing apparatus is installed indoors. Because normal height under beam of sewer equipment is 6.5 m in Japan (about 7 m in Western countries), height of apparatus must be in range where washing nozzle set on topside can be inspected without difficulty.

Recently, without installing several apparatuses at each section divided by each source, high and low range density gas tend to be mixed and treated at the same time. Then large capacity of range from 500 m3/min to 1000 m3/min is started to be in demand. Such a situation causes problem of impossibility of installing in space for conventional biological deodorizing apparatus having capacity of about 200 m3/min. Further, there is another problem that the deodorizing apparatus using living organism requires long culturing term to bring its ability into full work.

A gas-flow-in area (frontage×height) is widen to meet increase of treating amount. In the case where gas density goes high, number of deodorizing units is increased and apparatus becomes longer. No one raise an objection to the fact that running cost for biological deodorizing is less than one tenth of the cost for washing by liquid chemicals or activated carbon device, and it is ideal apparatus without the maintenance trouble nor the pollution problem. Then problems mentioned above are expected to be solved. Though an apparatus is evaluated by products cost and running cost, the objective of present invention is to provide an apparatus which can be constructed in size fits for limited space and whose cost is also low.

SUMMARY OF THE INVENTION

The biological deodorizing apparatus assembled with box-like frame units of the present invention has an inlet portion of malodorous gas, a treating portion and an outlet portion in a series, and relates to a deodorizing apparatus which biologically deodorizes gas in said treating portion. This is ordinary type.

Each of frames of said inlet portion, said treating portion and said outlet portion is composed of one or more same box-like frame units constructed by connecting uniformly shaped frame members and at least one type of uniformly shaped joints. Considering the joints, they are classified to the type of connecting the frame members perpendicularly at corner and the type of connecting the frame members on same axis line. Then in the case where an opening area is widen, the frame members are possibly connected on same axis line. Therefore, the expression "at least one type" is used. Similarly, considering the units, supposing both case where single unit is used or more than two units are used, the expression "one or more" is used.

Said box-like frame units' open surfaces being obstructive of gas treating are sealed with seal panels. The "open surfaces being obstructive of gas treating" are such surfaces through which gas leaks outside without being treated.

Said inlet portion is provided with a gas inlet opening and a humidifier.

Said treating portion is composed of said box-like frame units containing cartridges which can be pulled out free in horizontal direction and whose outer frames are set by several porous plastic sheets in parallel with each other at a distance.

As already known, these porous plastic sheets are what for collective microorganism fixing system. Though single body of this cartridge can be used alone, by connecting several cartridges as one body, treating capacity and handling ability are improved.

Said outlet portion is provided with a gas outlet opening. This gas outlet opening can be directly opened in air, or also can be connected to outlet pipe such as duct and opened in air through the pipe.

Then, according to type, amount and density of the gas, required number of said box-like frame units are connected, and said treating portion's blow-off surface located upper on gas channel is connected to lower located blow-in surface of said treating portion or said outlet portion in airtight condition, and then open surfaces being obstructive of gas treating are sealed with seal panels. Said gas inlet opening is connected to a source of the malodorous gas, said gas outlet opening is opened in air, and on said treating portion nozzle headers are placed and connected to a water supply pipes, and then below said treating portion and said outlet portion receiving plates are placed and connected to water draining pipes.

<The Inlet Portion (The Inlet Chamber)>

This portion is the chamber locates at the most front portion of the apparatus, and on its ceiling portion, end wall, or side wall, has a opening which connects to duct. Its inside is provided with a spray to supply water required for microorganisms to exist and kept in the condition where humidity is always 100 percent. Further, at exit side of this inlet portion, regulator screen is preferably provided to let gas flow uniformly to following treating portion.

<The Treating Portion (The Deodorizing Cartridge)>

This portion locates at center of apparatus, and includes one or more cartridges. Number of cartridges is decided to be required number according to the type of gas and its density. Between each deodorizing cartridge and on the backside of rearmost deodorizing cartridge, demister screens are preferably arranged. Then, washing water being flowed on sheets in planed order to keep environment for microorganisms living on the sheets contained in deodorizing cartridges can be preferably avoided from scattering to next cartridge.

<The Outlet Portion (The Outlet Chamber)>

This portion is the chamber locates at the rearmost portion of the apparatus, and where the gas treated at deodorizing cartridges is discharged. On its top portion, end portion, or side portion, an opening opened in air or connected to a duct is formed. The blow-off surface of the treating portion and a blow-in surface of this outlet portion are connected in airtight condition and gas is avoided from passing short cut and leaking outside without treated.

<The Sprinkle Headers (The Sheet Washing Nozzle Device)>

A top portion of top layer of the deodorizing cartridges is provided with box-like frame units being as same as the one contains the cartridges, or similar box-like frame units constructed with frame members and joints whose size are modified. Open surfaces of these box-like frame units are sealed with seal panels, and inside of each cartridges is provided with motor operated valves and nozzle boxes to wash sheets automatically. Drain water is served in plates set at bottom portion, and discharged outside through water-draining pipes.

<The Substructure>

This substructure (steal frame) is to support the deodorizing apparatus. This space is to contain pH meter for washing drain from cartridge containing sheets, flow meter for humidifying and washing water, supplying and draining pipes and so on.

The biological deodorizing apparatus assembled with box-like frame units of the present invention excludes inner waste space and is minimized in such size as comparable as apparatuses using washing by liquid chemicals or activated carbon device.

Especially, in the case of treating high density gas, though liquid chemicals or activated carbon requires multistage treatment and it has to make apparatus longer, applying biological deodorizing enables treating without making apparatus longer.

Further, by standardizing frame members and joints of each box-like frame unit of apparatus as modules, constructing box-like frame units at factory, and connecting box-like frame units at the construction site, production and transportation cost are drastically reduced.

Furthermore, by determining to use particular type of cartridges so that all of the deodorizing cartridges is standardized as single standard module having same size, it is possible to flexibly meet to any apparatuses of any size.

When apparatus applies sheets enable collective microorganism fixing in large quantities, for each kind of malodorous material, according to density, for each material density, the required number of sheets is decided whereby the deodorizing apparatus can be designed.

Preferably, said outlet portion follows auxiliary treating device having an activated carbon treating portion and a second outlet portion, and is to be connected to or shut off from said auxiliary treating device as said gas outlet opening opens or closes.

In this case, by closing the outlet opening at early operating stage where biological activation is not enough achieved, malodorous gas can be treated by the activated carbon thorough the auxiliary treating device, and incomplete treating can be avoided.

Preferably, said blow-off surface and said blow-in surface are connected by a hood in airtight condition.

In this case, inside of the blow-off surface and the blow-in surface can be easily kept in airtight condition.

Preferably, said blow-off surface belongs to a demister cartridge fixed at said cartridge.

In this case, because the cartridge and the demister cartridge are combined in one body, they are easily slid into and out box-like frame units and washing water being flowed on sheets does not scatter to next cartridge or outlet portion. So it is preferable. Further, gas is avoided from passing short cut.

Preferably, said hood consists of a portion for blow-off surface and a portion for blow-in surface, and both portions are detachably connected by a fastener.

In this case, because the hood splits to a portion for blow-off surface and a portion for blow-in surface, setting to each portion is easily achieved and they are easily combined in one body by fastener.

Preferably, said portion for blow-in surface is, at its rim portion on the other side of said fastener, fixed with respect to said frame members forming one of said open surfaces of said box-like frame unit.

In this case, because the portion for blow-in surface is fixed at the frame members, it is easily connected to the portion for blow-off surface. Enough airtight condition is also achieved.

Preferably, said frame member is plastic square tube whose ends of inner space function as joint portions.

In this case it can be made at low cost and easily molded. Then its ends can be used as joint portions.

Preferably, said joint is made of plastic and portions to be jointed with said joint portions of said frame member protrude from each of two or more adjacent surfaces of rectangular hexahedron main body so as each of axes are at right angles to each other.

In this case, it can be made at low cost and easily molded. Then it enables to connect each frame members vertically.

Preferably, said portion to be jointed is regular octahedron protrude whose one or more pairs of facing surfaces parallel a pair of facing surfaces of said joint and length between the facing surfaces of said regular octahedron protrude fits for inner length of said joint portion.

In this case, because a regular octahedron protrude is tightly inserted into an angular hall, it is easily inserted and tight contacting condition can be achieved.

Preferably, said portion to be jointed is cylindrical protrude whose outer diameter fits for inner length of said joint portion of said frame member.

In this case, because a cylinder is tightly inserted into an angular hole, their connecting condition is not obstructed by dimensional error in some degree.

Preferably, said portion to be jointed is square columnar protrude which is tightly inserted into said joint portion of said frame member.

In this case, though it is difficult to mold in some extent, it can be connected very tightly and resistance to vibration of earthquake is improved.

Preferably, said seal panel is shaped to fit for said open surface of said box-like frame unit, and a rim portion is fixed to said box-like frame unit by rivets so as said open surface is sealed.

In this case, the seal panel is easily fixed to the box-like frame units, and the open surface is sealed in airtight condition by simple way.

Preferably, an outer surface of said seal panel is covered by an outer wall panel fixed to said box-like frame unit with heat insulator provided on its inner surface.

In this case, because temperature is restrained from changing at inside of the box-like frame unit by outer wall panel with heat insulator, living environment for microorganisms is kept ideal and gas is effectively deodorized.

Preferably, said outer wall panel is fixed to said box-like frame unit by binders, said binder is made of plastic, has fins at one end of a stem, and has an inner head portion and an outer head portion at the other end. Then preferably, Length between said inner and outer head portions fits for thickness of a round frame of said outer wall panel, while outer diameter of said outer head portion is smaller than inner diameter of a circular potion of keyhole perforating through the round frame on inner surface of said outer wall panel, and inner length of a lock portion which continues to said circular portion is smaller than outer diameters of said inner and outer head portions. Then preferably, said fins are elastically deformed and allow said stem to be pressed into a through hole perforating through said box-like frame units.

In this case, after hooking the binders temporally at the lock portions of the keyholes of the round frame by its inner and outer head portions and putting the outer wall panel on the outer surface of seal panel, by hitting the outer surface of outer wall panel as placing the top edges of the stems of the binders at the through holes, the binders are driven into the through holes, and fins pass deforming elastically through the through holes. After passing the through holes, fins are returned to its original states, and the outer wall panel is prevented from falling off the box-like frame unit. Therefore, the outer wall panel is easily and certainly fixed at the box-like frame unit.

Preferably, said cartridge is placed across inside of said box-like frame unit being pulled out free by placing rollers of said outer frame on horizontal guides provided at said box-like frame unit.

In this case, because the cartridge is slid into and out the box-like frame unit in horizontal direction, top portion of the apparatus can be located close to ceiling without causing any problem. Further, because of the rollers, even heavy cartridge can be easily slid into and out.

Preferably, supporting rods are placed across said cartridge at its top and bottom portions at right angles to said blow-in surface, several sheet receivers are placed across and carried by said supporting rods with spacers between the sheet receivers, said sheets are supported by own top and bottom edges tightly inserted respectively into each of said sheet receivers facing each other at top and bottom.

In this case, because of being supported by sheet receivers, sheets are stable without flapping in condition pressured by wind and ensure keeping space their between. Therefore deodorizing efficiency is improved.

Preferably, above said cartridge, the apparatus has partition members which is tightly inserted into grooves on each top side of said sheet receivers and stretch along said sheet receivers and whose top edge portions are close to a source of flow water.

In this case, water is uniformly supplied to the sheets and a good condition for growth of microorganisms can be kept.

Preferably, said nozzle header is made of transparent materials and, at ceiling panel overlaid upper surface of top located said cartridge, fixed covering nozzles fixed through said ceiling panel, and rotor blades rotate by water flow are placed across opening portions of said nozzles at side near to said nozzle header.

In this case, because it can be checked visually if water stops flowing, it is possible to inspect easily if the apparatus operate perfectly.

BRIEF DESCRIPTION OF THE DRAWINGS

FIG. 13 (*b*) is a plan view shows keyholes (44, 44') formed at round frames (43, 43') of outer wall panels (37, 37') for binders (38).

DETAILED DESCRIPTION OF THE PREFERRED EMBODIMENT

Figure 1:
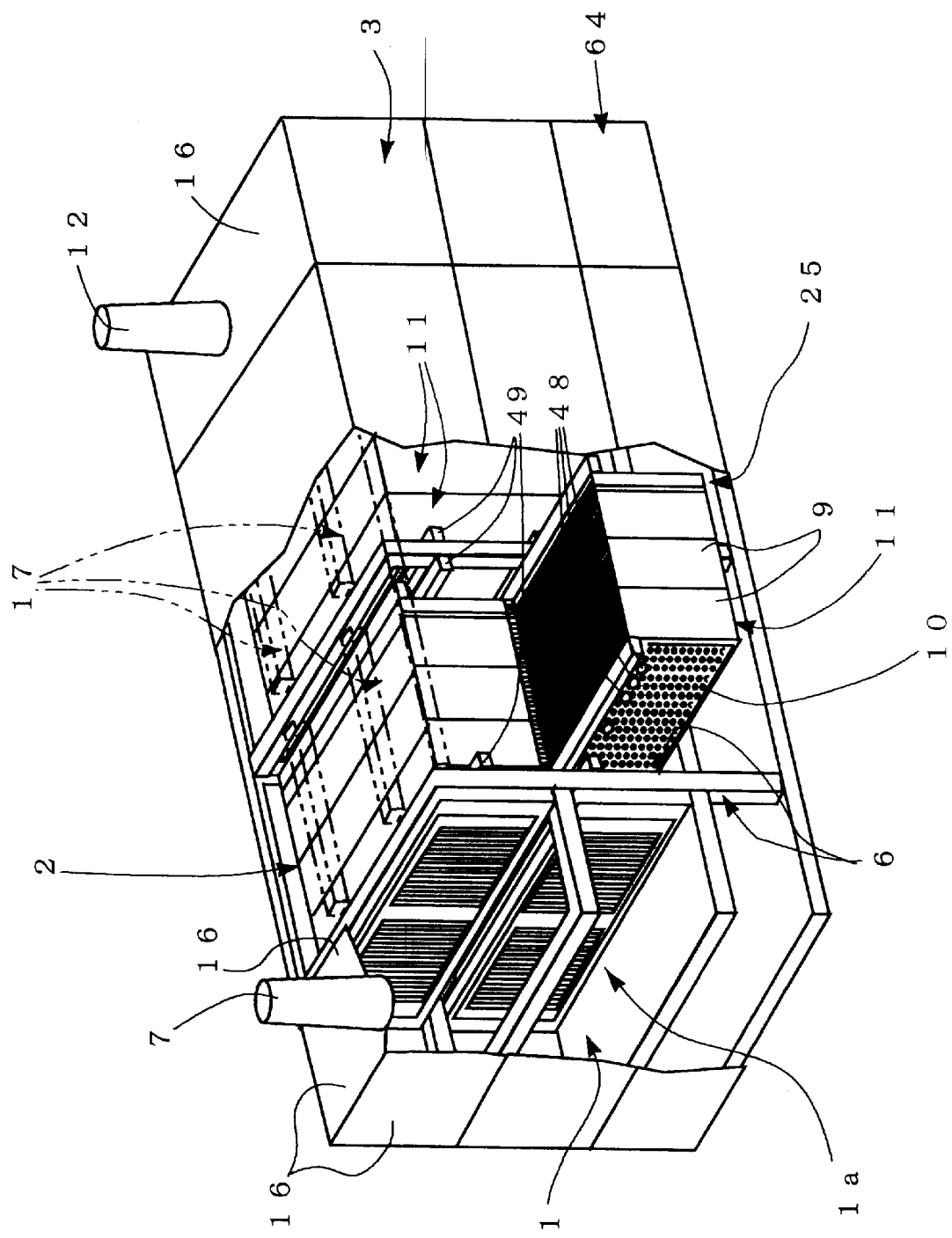
FIG. 1 is a partially cut off perspective view which shows an example of biological deodorizing apparatus assembled with box-like frame units of present invention considering the case having two stages construction.

The biological deodorizing apparatus assembled with box-like frame units of the present invention has an inlet portion 1 of malodorous gas, a treating portion 2 and an outlet portion 3 in a series, and biologically deodorizes gas in said treating portion 2. This is ordinary type.

Each of frames of the inlet portion 1, the treating portion 2 and the outlet portion 3 is composed of one or more rectangular hexahedron box-like frame units 6 constructed by connecting frame members 4 and joints 5. As frame member 4, only one type of uniform composition is enough.

The joint 5 is the type to be used at corner. However, in the case where the size of apparatus is so large that the size of frame member 4 is not enough for construction, slightly different type of joint 5' (refer FIG. 10) to connect each frame member 4 on straight line is to be used.

Figure 3:
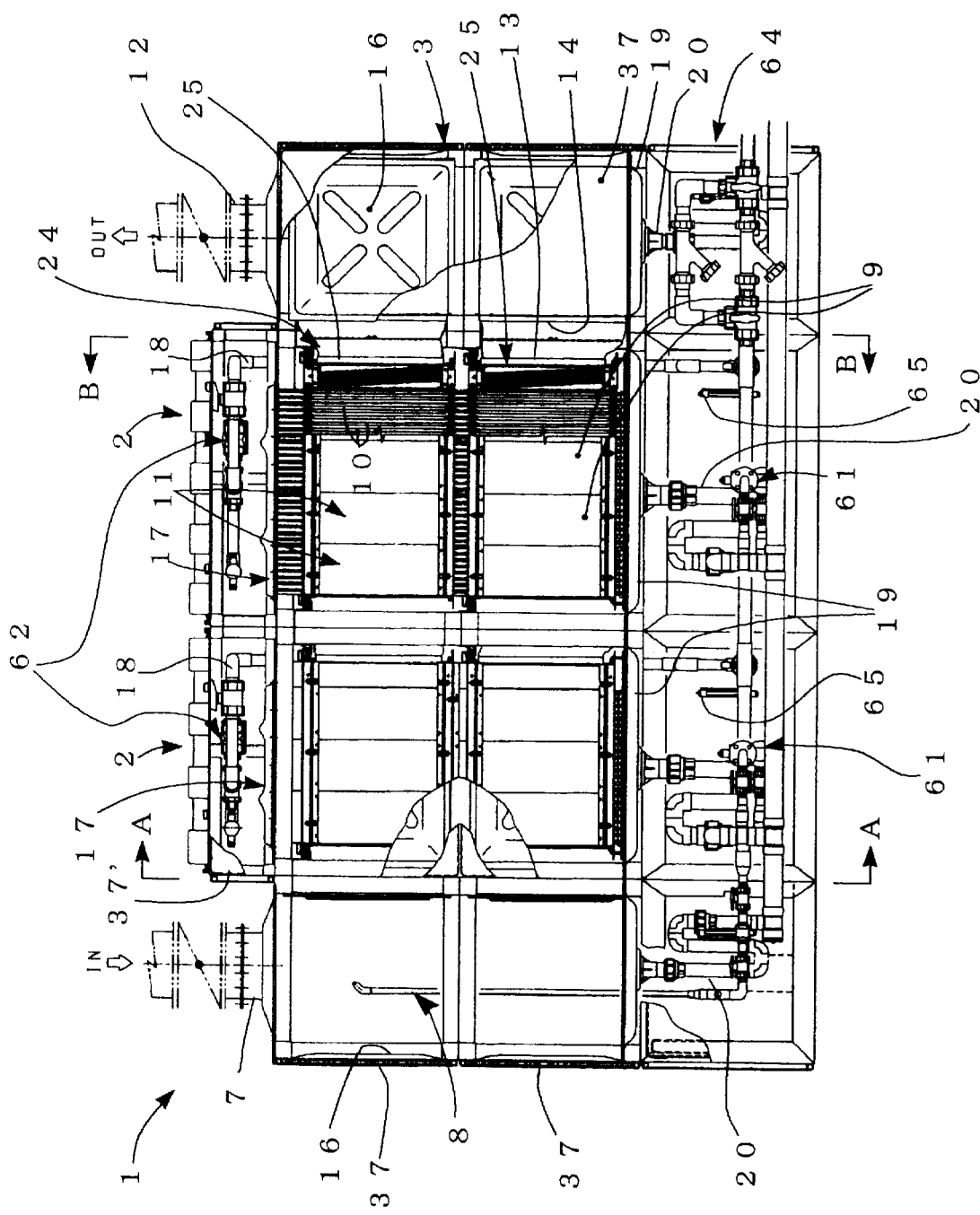
FIG. 3 is a side view wherein detail of example in FIG. 1 is shown, treating portion (2) is a type having two rooms at front side and rear side along gas flow, seal panels (16) on near side are removed except several on treating portion (2) and outlet portion (3), the front side room of treating portion (2) is type of containing 24 cartridges, the rear side room is type of containing 32 cartridges, and the cartridge set in right end portion of the rear side room is shown being removed its outer frame (9) (of FIG. 1).

The inlet portion 1 is provided with a gas inlet opening 7 and a humidifier 8 (refer FIG. 3). This humidifier 8 humidifies gas to activate eating action of microorganisms.

The treating portion 2 is composed of the box-like frame units 6 containing cartridges 11 which can be pulled out free in horizontal direction and whose outer frames 9 are set by several porous plastic sheets 10 in parallel with each other at a distance. Differing from conventional method such as pulling up by crane, it is taken into and out in horizontal direction. Therefore, space between top end of apparatus and the ceiling is not required, and it is possible to raise the height of apparatus. Single body of this cartridge 11 can be used alone. However as shown in FIG. 1, by combining two cartridges in one body treating capacity can be improved and by arranging several of this combined two cartridges in series deodorizing ability can be further improved.

The outlet portion 3 is provided with a gas outlet opening 12. Treated gas can be discharged in the air without causing any problem. When it is needed to select the place to be discharged, by connecting a duct to the gas outlet opening 12 the requirement is satisfied.

According to type, amount and density of the gas, the box-like frame units 6 are connected as many as required for inlet portion 1, treating portion 2, and outlet portion 3 respectively. Treating portion 2's blow-off surfaces 13 located upper on gas channel are connected to lower located blow-in surfaces 14 of the treating portion 2 or the outlet portion 3 in airtight condition, and open surfaces 15 being obstructive of gas treating are sealed with seal panels 16. A gas inlet opening 7 is connected to a source of malodorous gas, and a gas outlet opening 12 is opened in air. Then on the treating portion 2 nozzle headers 17 are placed and connected to water supply pipes 18, and below the inlet portion 1, the treating portion 2 and the outlet portion 3 receiving plates 19 are placed and connected to water draining pipes 20. Therefore, size of the apparatus is, by choosing the number of the box-like frame units 6, decided freely and its construction is also very easy.

Figure 4:
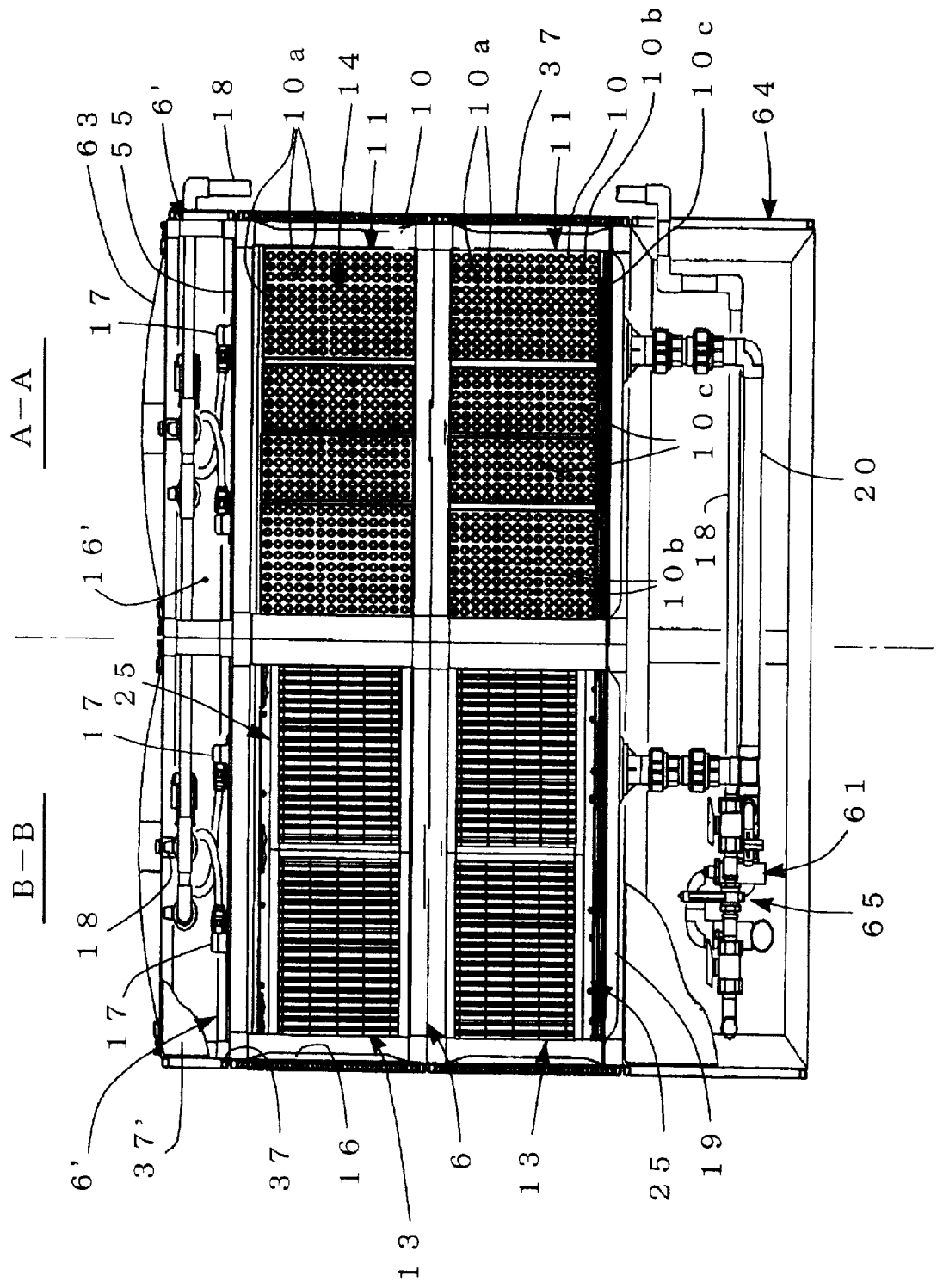
FIG. 4 is a combination of a sectional view along A—A line and a sectional view along B—B line in FIG. 3.
Figure 5:
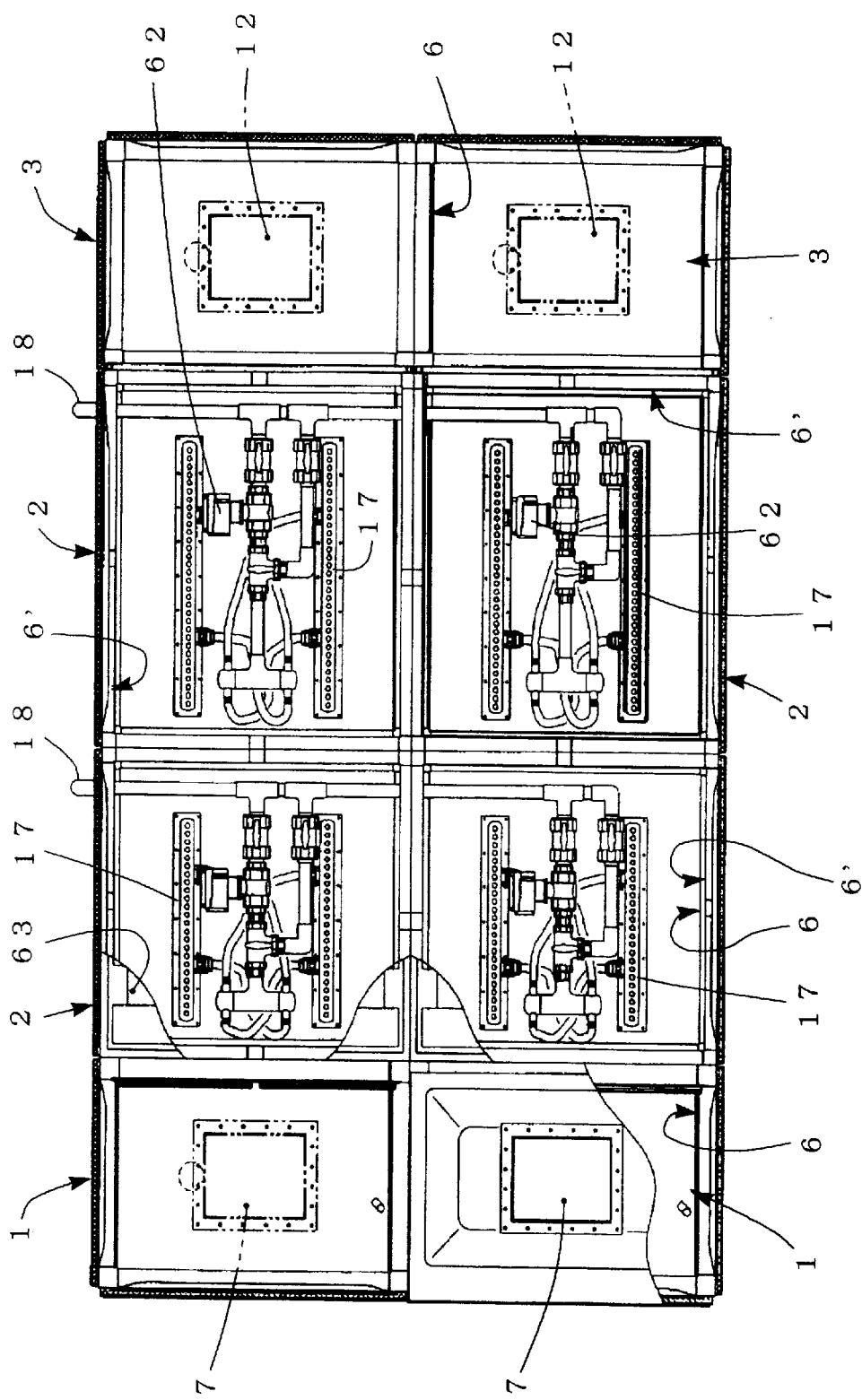
FIG. 5 is a plan view wherein most of roof plates (63) are removed and nozzle headers (17) are shown.
Figure 18:
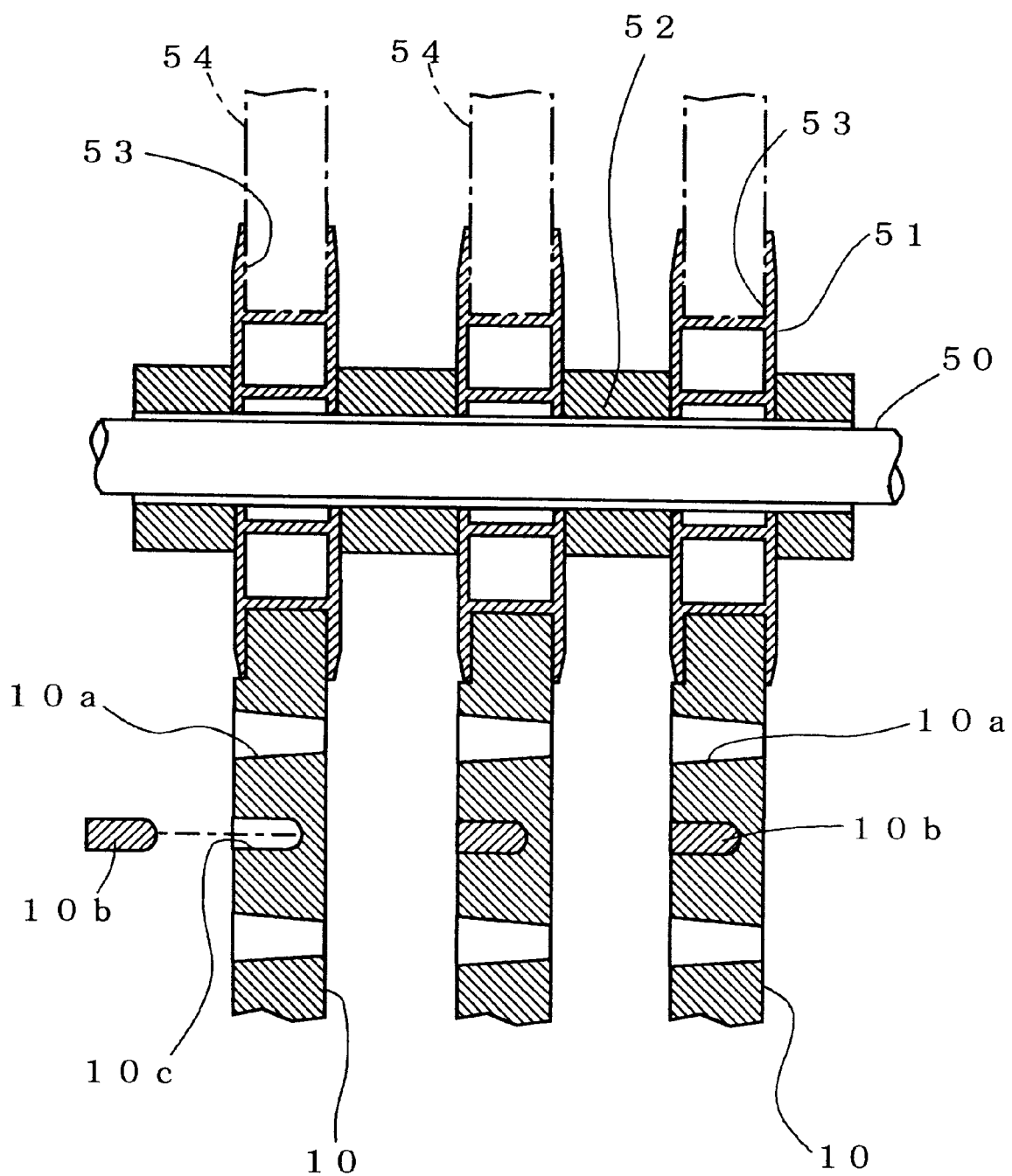
FIG. 18 is an extended view of a part around sheet receivers (51) at upper right side in FIG. 14.

As already known, these porous plastic sheets 10 are for collective microorganism fixing system, and as shown in FIGS. 4 and 18, they are perforated with many of gas flow pass 10a and on their surfaces there are some holes 10c where beads 10b are inserted. The beads 10b are, after cultivated with microorganisms, inserted into the holes 10c of sheets 10. By this way, culturing of microorganisms on the sheets 10 is accelerated.

The malodorous gas flowed into the inlet portion 1 through inlet opening 7 is humidified by humidifier 8, and its contacting efficiency to the sheets 10 is improved. When a regulator screen la is provided, the gas is equalized and flows into the following treating portion 2.

The malodorous gas blew into the treating portion 2 hits the sheets 10, passes the gas flow passes 10a, blows out the blow-off surface 13, and then blows into the outlet portion 3 through its blow-in surface 14 connected to the blow-off surface 13 in airtight condition. These sheets 10 are cultivated with a lot of microorganisms being supplied with water by the nozzle headers 17, and when the malodorous gas passes the sheets 10, some of malodorous components are ate by microorganisms. Then the gas is deodorized. To cope with the case where gas is malodorous complex, on each of cartridges 11, or on each of combined body of cartridges, each of microorganisms suitable for each of component is preferably cultivated. Further, to cope with the case where density of malodorous gas is high, the treating portion 2 is preferably added by another treating portion.

During operation of the apparatus, if treating capacity is decreased because of wastes or carcasses of microorganisms, the sheets 10 of cartridges 11 are supplied with water by nozzle headers 17 and washed out. The pH meters 61 for drain water which flows from the receiving plates 19 to the draining pipes 20 are preferred to be connected with motor operated valves 62 so as the sheets 10 are washed out automatically.

In FIG. 1 to FIG. 5, the nozzle headers 17 are fixed on a ceiling panel 55 covering top surface of the box-like frame units 6 located at top layer of cartridges 11. Further above them, another box-like frame units 6 or, similar box-like frame units 6' being constructed with frame members and joints varied in size are arranged, and open surfaces 15 or 15' of these box-like frame units 6 or 6' are sealed with seal panels 16 or 16'. Opening surfaces at top is preferably sealed with roof plates 63. Water supplied from nozzle headers 17 is sprinkled on top surfaces of sheets 10 through nozzles 56 (refer FIG. 20) perforating through ceiling panel 55, and continues to drop along their faces. Then the water is accumulated in the receiving plates 19 and leaded to outside by the draining pipes 20.

In FIGS. 1, 3, and 4, numeral 64 indicates the substructure and is steal frame supporting the deodorizing apparatus. This space is to contain pH meters 61 for washing drain, flow meters 65 for humidifying and washing water, supplying pipes 18, draining pipes 20 etc.

This biological deodorizing apparatus assembled with box-like frame units is minimized in such size as comparable as apparatuses using washing by liquid chemicals or activated carbon device. Further, by standardizing frame members 4 or 4' and joints 5 or 5' of each box-like frame unit 6 or 6' of apparatus as modules, constructing box-like frame units 6 or 6' at factory, and connecting box-like frame units 6 or 6' at the construction site, production and transportation cost are reduced.

Furthermore, by determining to use particular types of cartridges 11 so as each of them are standardized as single type module having same size, it is possible to flexibly meet to any apparatuses of any size. Therefore, for each kind of malodorous material, according to their density, the required number of sheets is preferably decided whereby the deodorizing apparatus can be designed.

Figure 6:
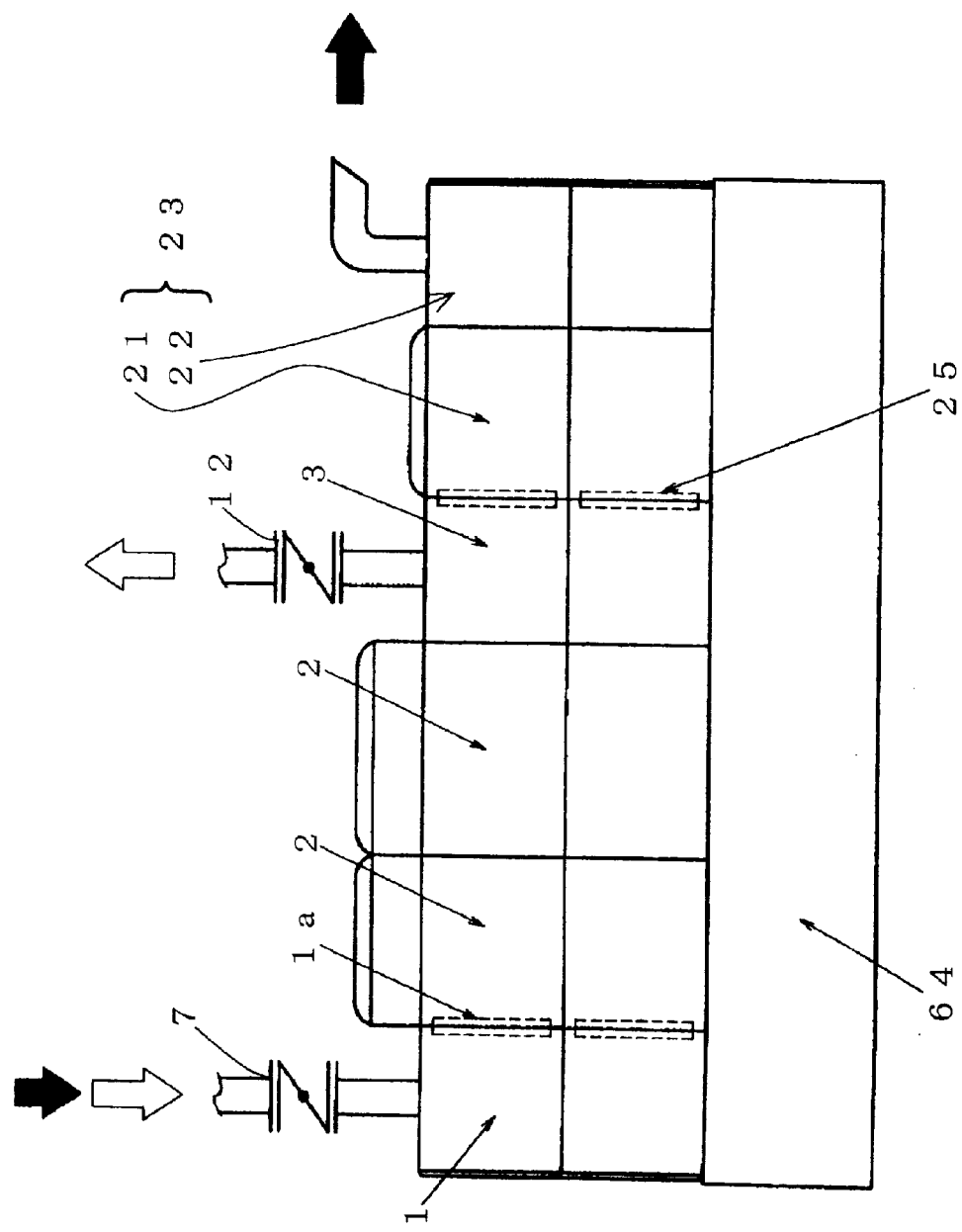
FIG. 6 is a rough side view shows a type of a biological deodorizing apparatus assembled with box-like frame units of present invention with an auxiliary treating device (23).

In FIG. 6, the outlet portion 3 follows an auxiliary treating device 23 having an activated carbon treating portion 21 and a second outlet portion 22, and is to be connected to or shut off from the auxiliary treating device 23 as the an outlet opening 12 opens or closes.

In this way, by closing the outlet opening 12 at early operating stage where biological activation is not enough achieved, the malodorous gas can be treated by the activated carbon through the auxiliary treating device 23, and incomplete treating can be avoided.

Figure 7:
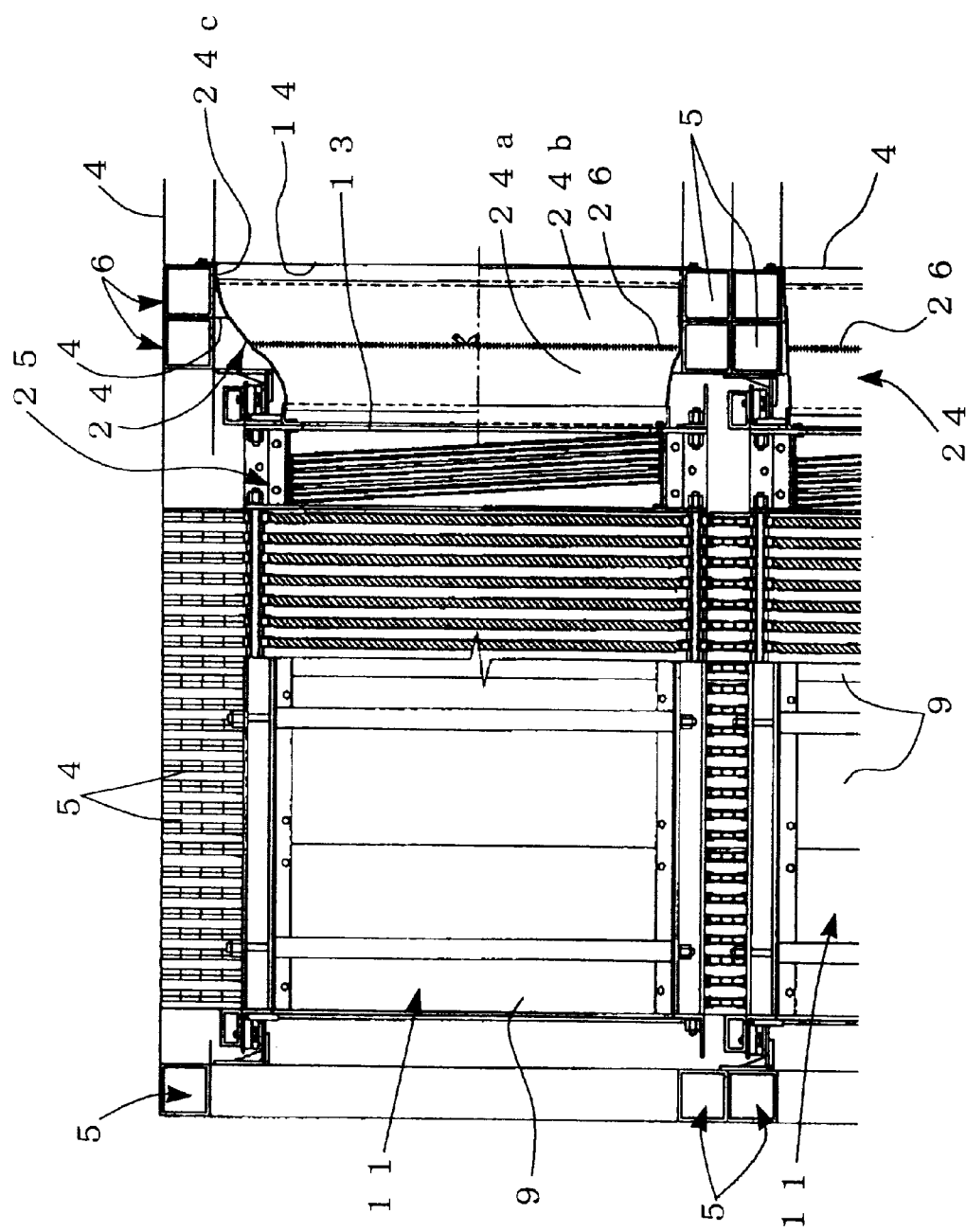
FIG. 7 is a side view shows under portion of the two stages type cartridge in condition where a part of itself is omitted and a part of its outside portion is removed.

In FIGS. 3 and 7, a blow-off surface 13 and a blow-in surface 14 are connected by a hood 24 in airtight condition. In this way, the blow-off surface 13 and the blow-in surface 14 can be easily kept in airtight condition.

The blow-off surface 13 belongs to the demister cartridge 25 fixed in cartridges 11.

In this way, because a cartridge 11 and a demister cartridge 25 are combined in one body, they easily slid into or out box-like frame units 6 and washing water being flowed on sheets 10 does not scatter to next cartridge 11 or outlet portion 3. So it is preferable. Further, the gas is avoided from passing short cut.

The hood 24 consists of a portion 24a for blow-off surface and a portion 24b for blow-in surface, and both portions 24a, 24b are detachably connected by a fastener 26.

In this way, because the hood 24 splits to the portion 24a for blow-off surface and the portion 24b for blow-in surface, setting to each portion is easily achieved and they are easily combined in one body by the fastener 26.

The portion 24b for blow-in surface is, at its rim portion 24c on the other side of fastener 26, fixed with respect to the frame members 4 forming one of the open surfaces 15 of the box-like frame unit 6.

In this way, because the portion 24b for blow-in surface is fixed at the frame members 4, it is easily connected to the portion 24a for blow-off surface. Enough airtight condition is also achieved.

Figure 8:
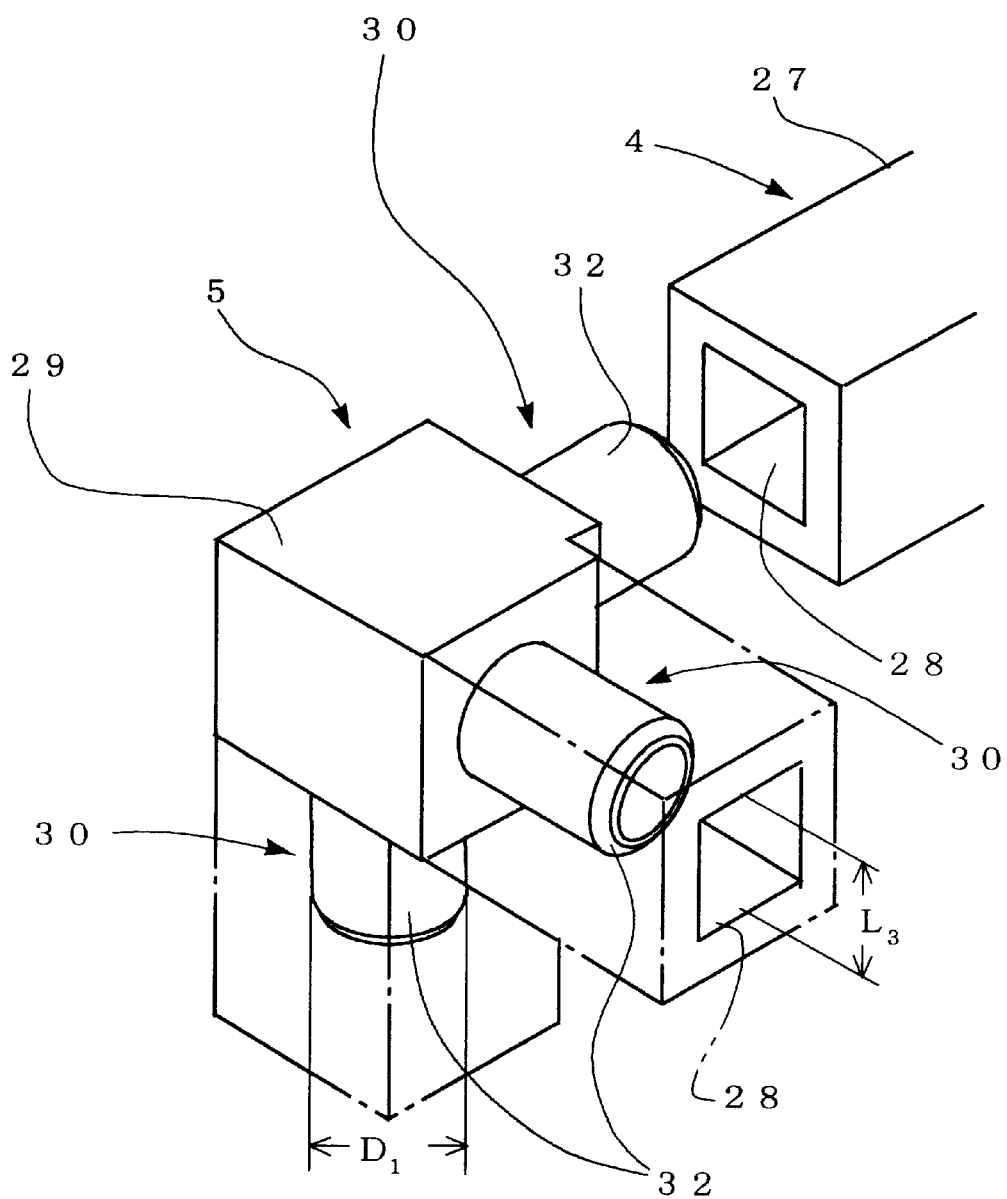
FIG. 8 is a perspective view shows a relation between frame members (4) and a joint (5).

In FIG. 8, the frame members 4 are plastic square tubes 27 whose ends of inner space function as joint portions 28.

In this way, it can be made at low cost and easily molded. Then their ends can be used as joint portions 28.

The joint 5 is made of plastic and portions 30 to be jointed with the joint portions 28 of frame members 4 protrude from each of two or more adjacent surfaces of a rectangular hexahedron main body 29 so as each of axes are at right angles to each other.

In this way, it can be made at low cost and easily molded. Then it enables to connect each frame members 4 vertically.

Figure 9:
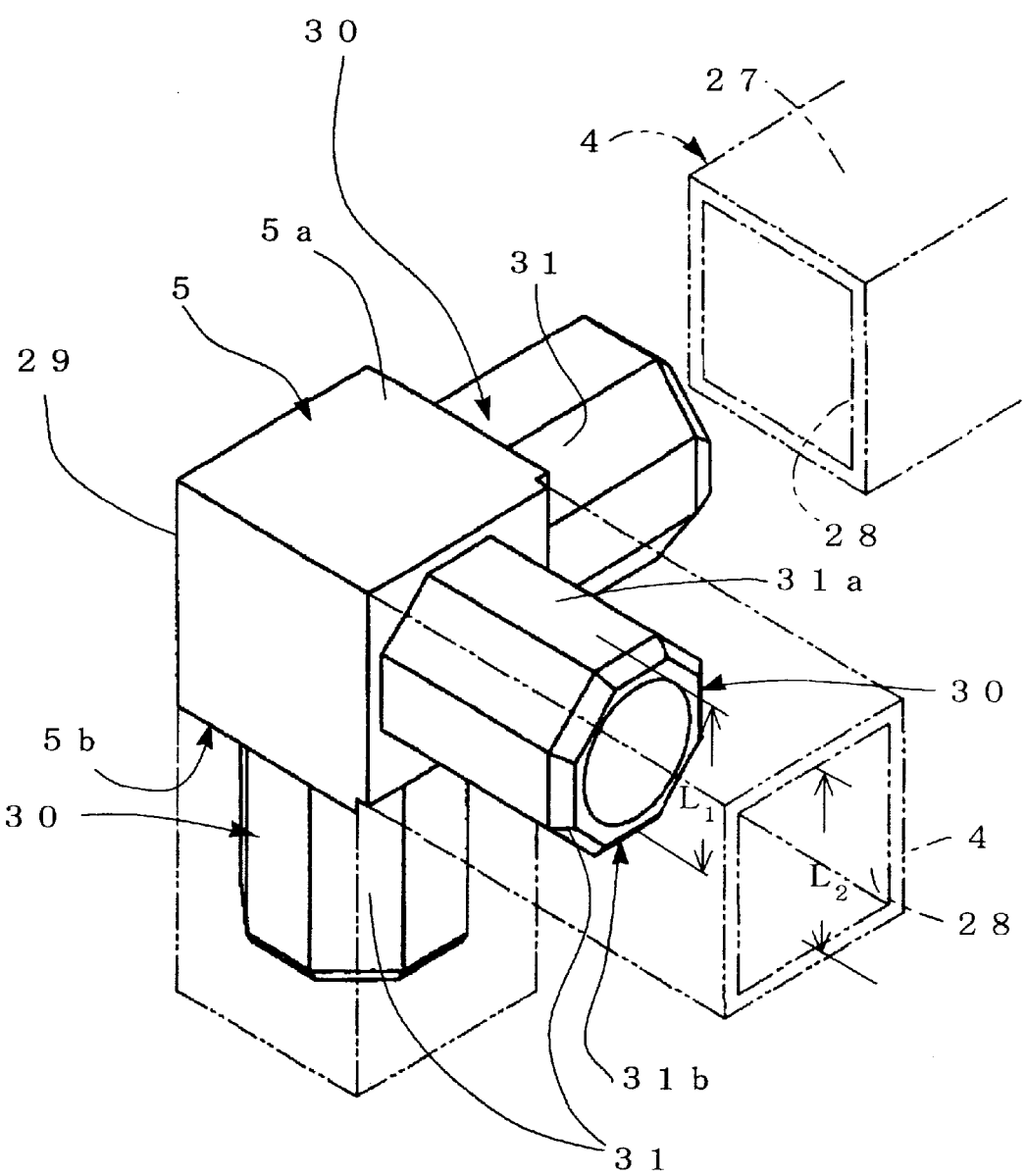
FIG. 9 is a perspective view shows a relation between frame members (4) and a joint (5) of other shape.

In FIG. 9, portions 30 to be jointed are regular octahedron protrudes 31 whose one or more pairs of facing surfaces 31a and 31b parallel a pair of facing surfaces 5a and 5b of joint 5 and length L1 between facing surfaces of regular octahedron protrudes 31 fits for inner length L2 of joint portions 28.

In this way, because the regular octahedron protrude 31 is tightly inserted into an angular hall, it is easily inserted and tight contacting condition can be achieved.

Figure 10:
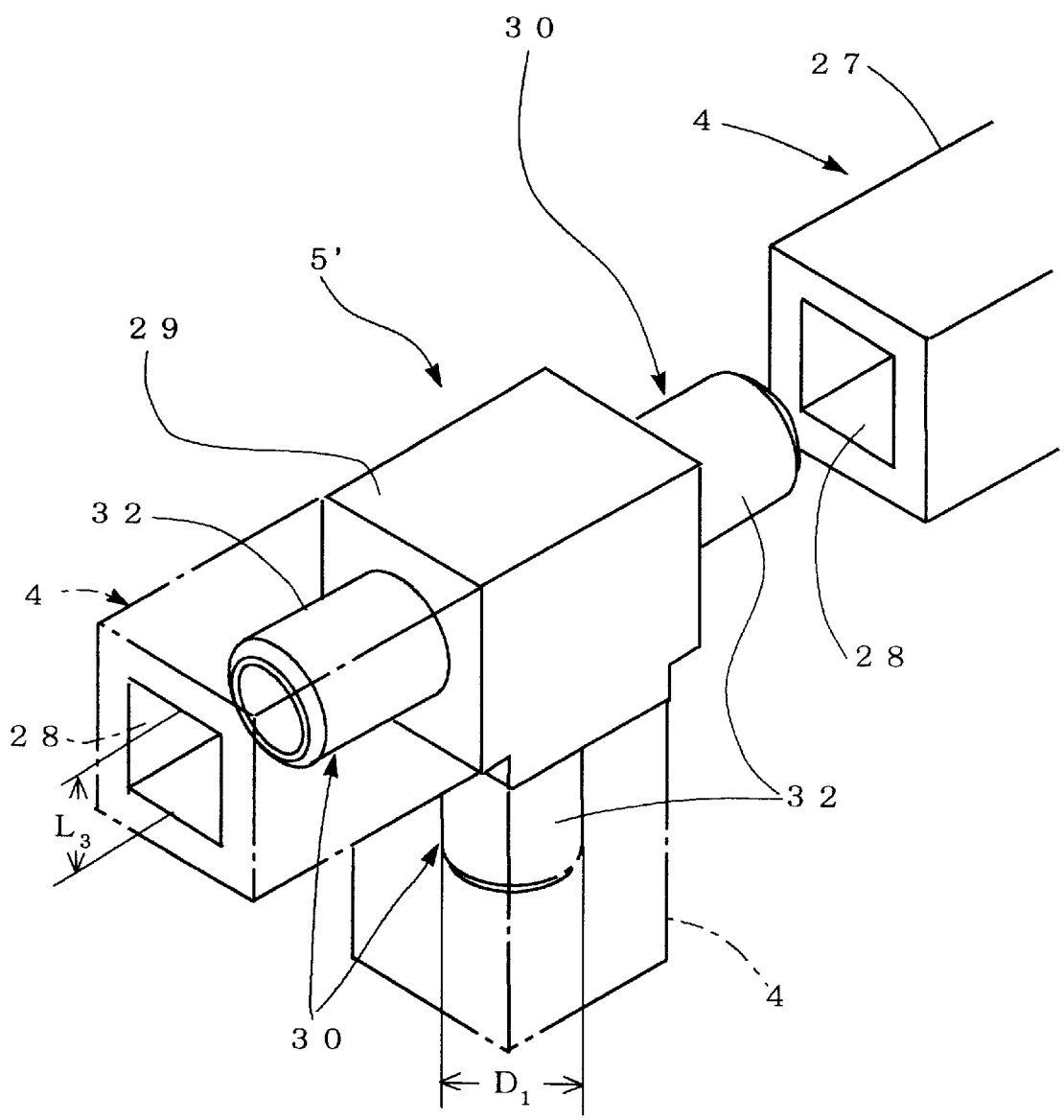
FIG. 10 is a perspective view shows a relation between frame members (4) and a joint (5') of other shape.

In FIGS. 8 and 10, portions 30 to be jointed are cylindrical protrudes 32 whose outer diameter D1 fits for inner length L3 of joint portions 28 of frame members 4. Though shown is a joint 5' having portions 30 to be jointed protrude in three directions in FIG. 10, it is suitable in the case where the joint 5 having portions 30 to be jointed protrude in two directions as seen in FIG. 8 is used.

In this way, because the cylindrical protrude 32 is tightly inserted into an angular hall, their connecting condition is not obstructed by dimensional error in some degree.

Figure 11:
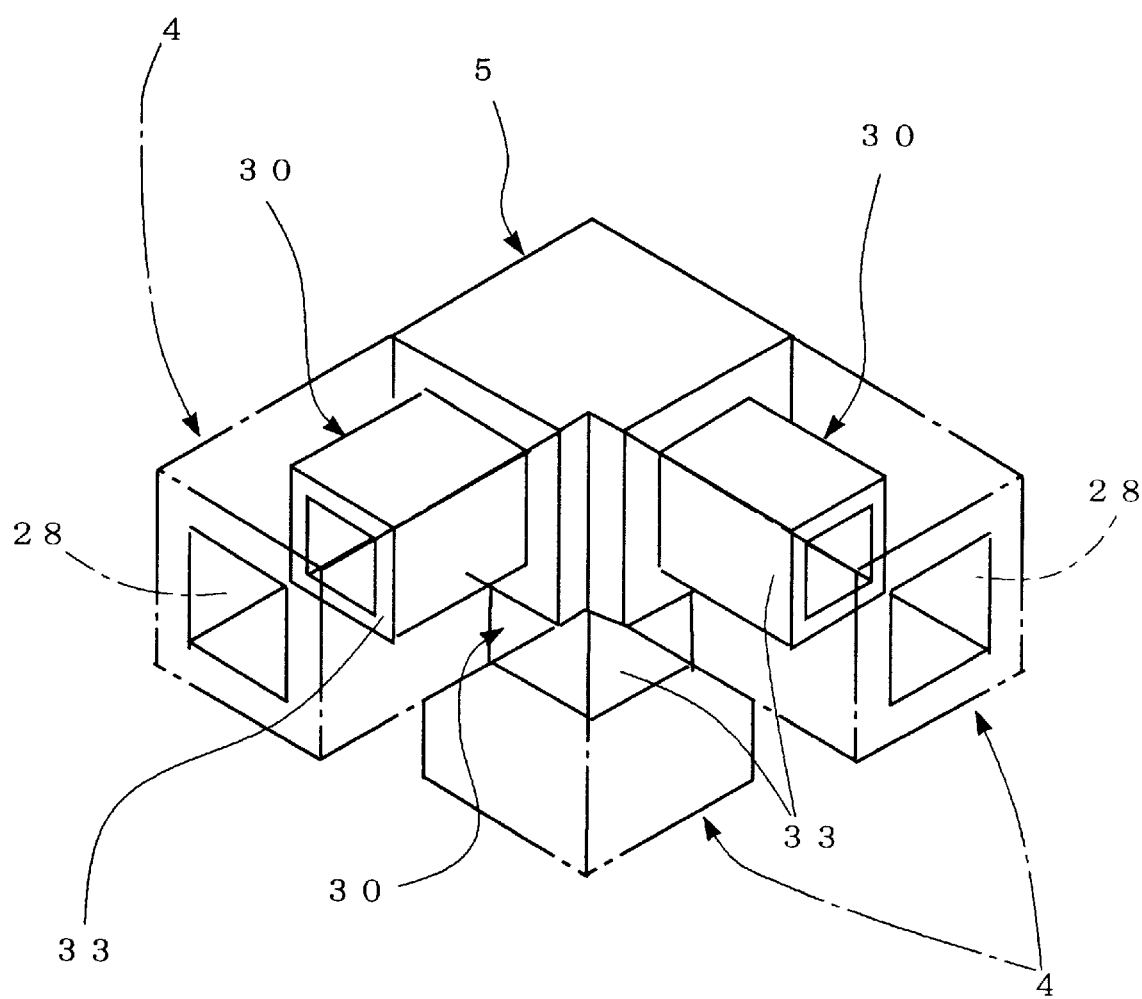
FIG. 11 is a perspective view shows a relation between frame members (4) and a joint (5') of other shape.

In FIG. 11, portions 30 to be jointed are square columnar protrudes 33 which tightly inserted into the joint portions 28 of frame members 4.

In this way, though it is difficult to mold in some extent, it can be connected very tightly and resistance to vibration of earthquake is improved.

Figure 2:
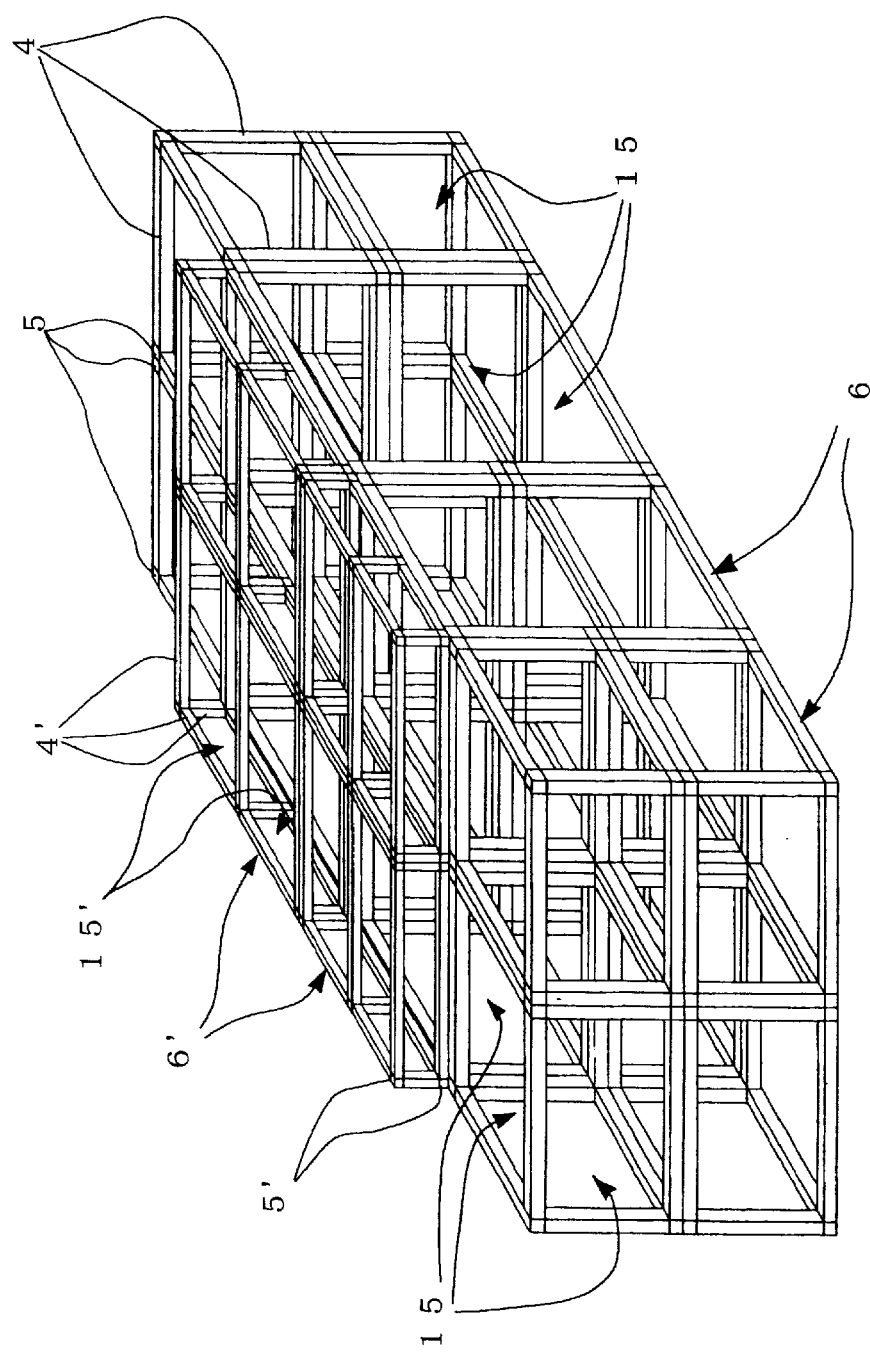
FIG. 2 is a perspective view shows an example of box-like frame units used for deodorizing apparatus of present invention in constructed condition.
Figure 12:
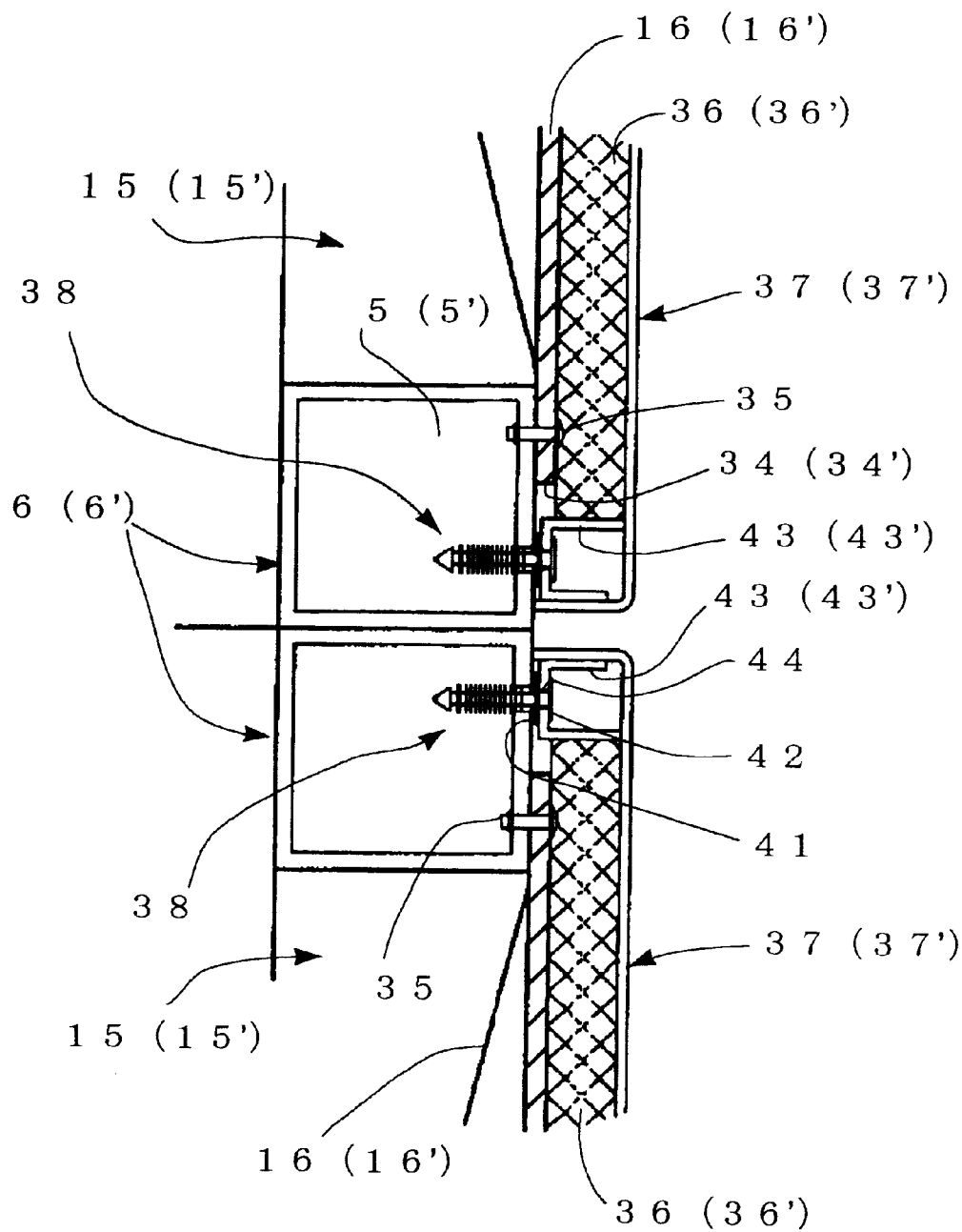
FIG. 12 is a detailed sectional view of connecting of seal panels (16, 16') and box-like frame units (6, 6').
Figure 13:
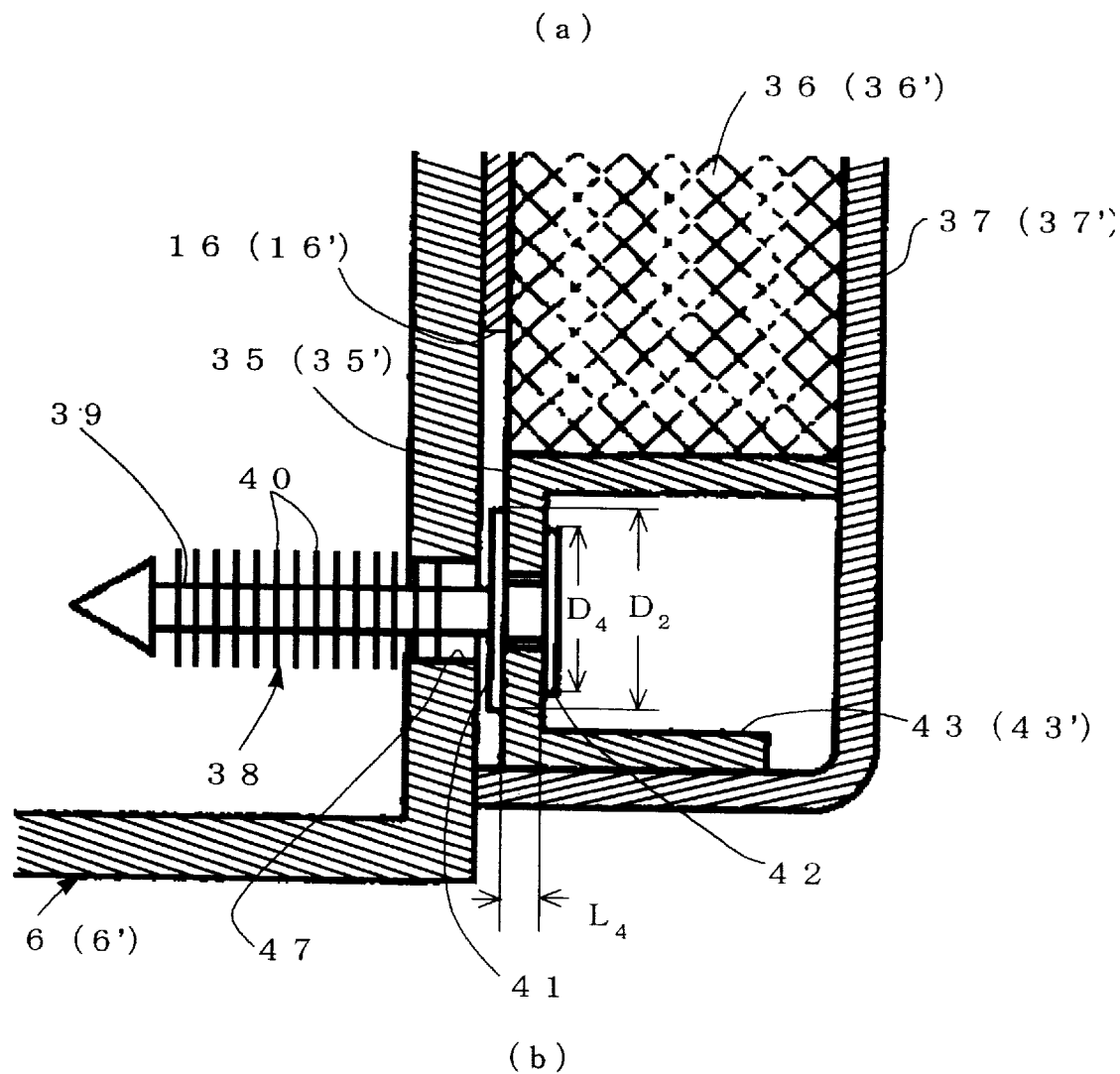
FIG. 13 (*a*) is a detailed sectional view of condition where outer wall panels (37, 37') are fixed at box-like frame units (6, 6').
Figure 14:
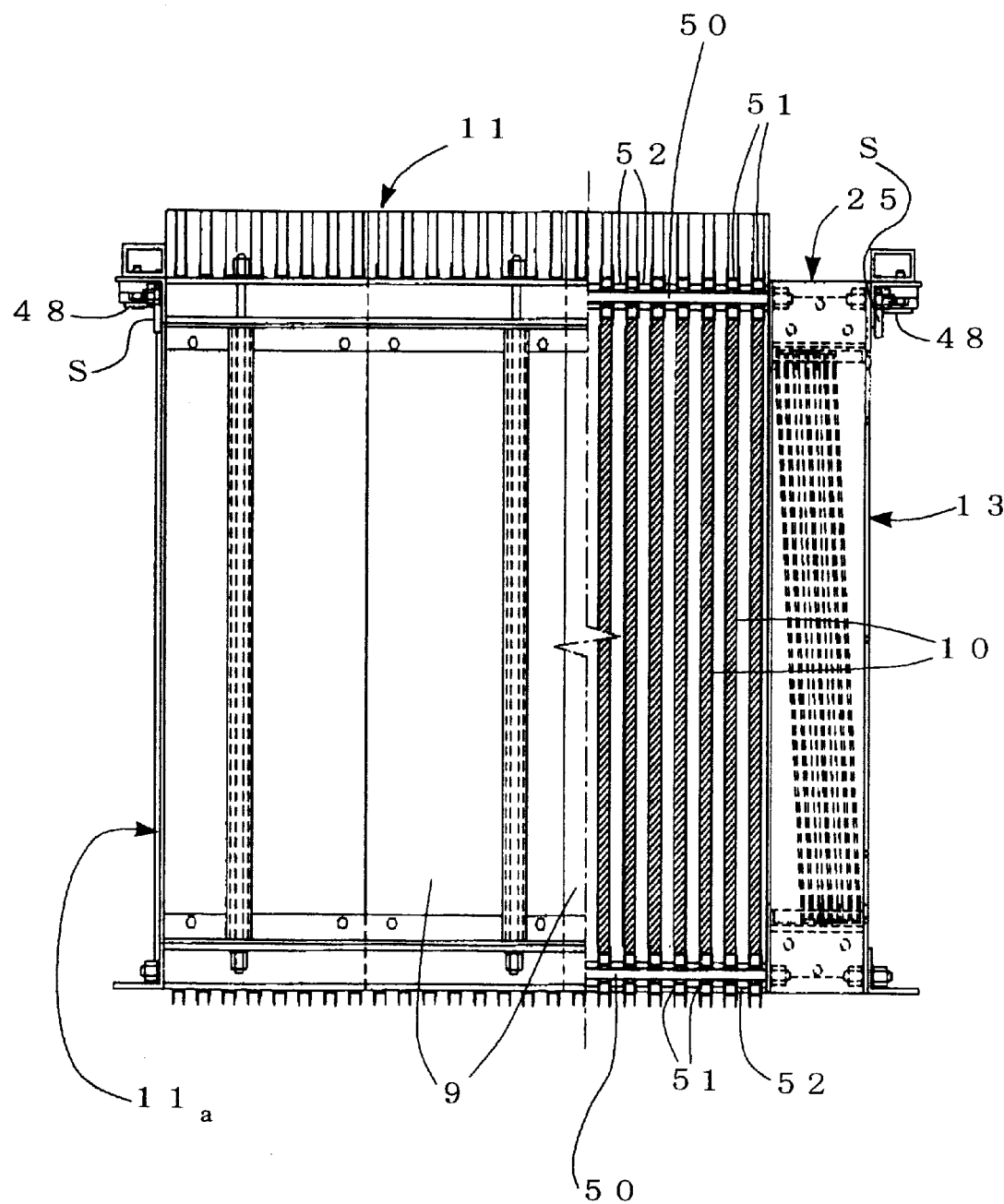
FIG. 14 is a detailed view shows 24 cartridges type in condition where a part of outer frames (9) of the cartridge set in right end is cut off.
Figure 15:
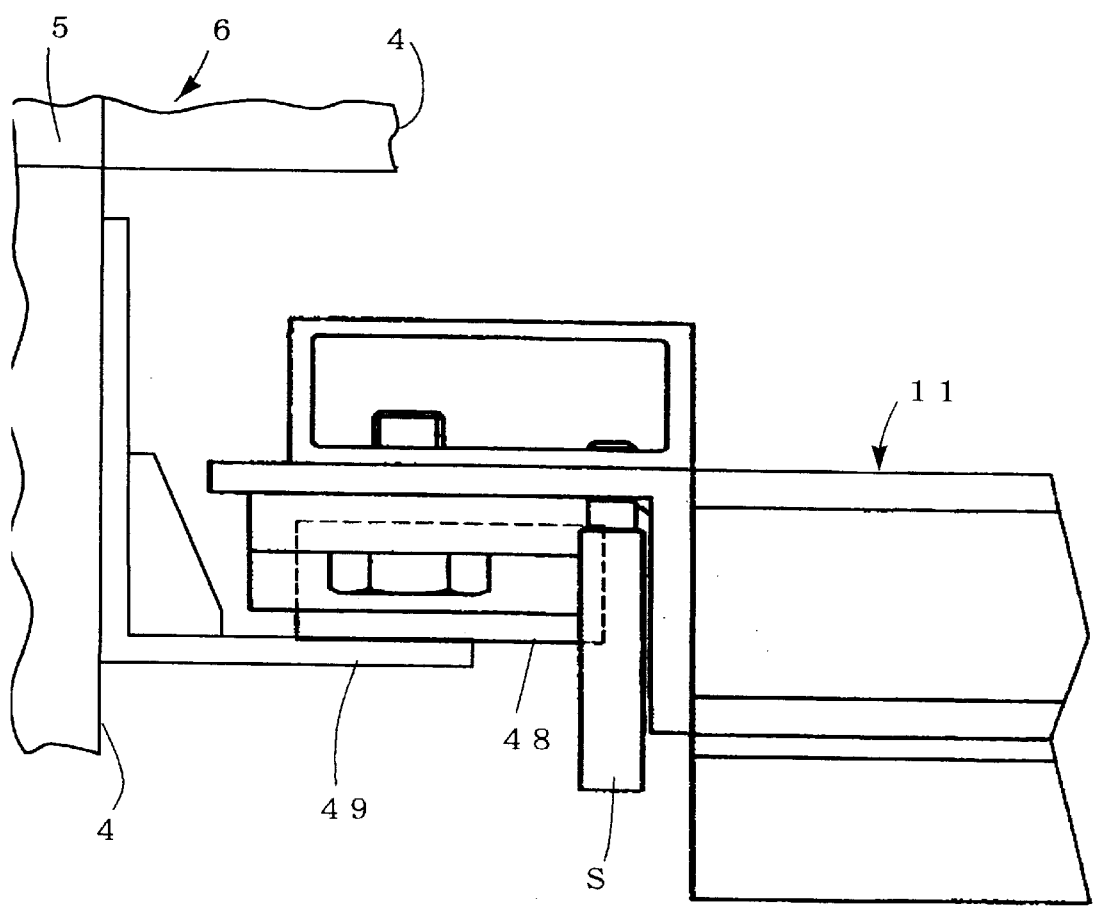
FIG. 15 is a detailed side view of a part around rollers (48) of the cartridge.
Figure 16:
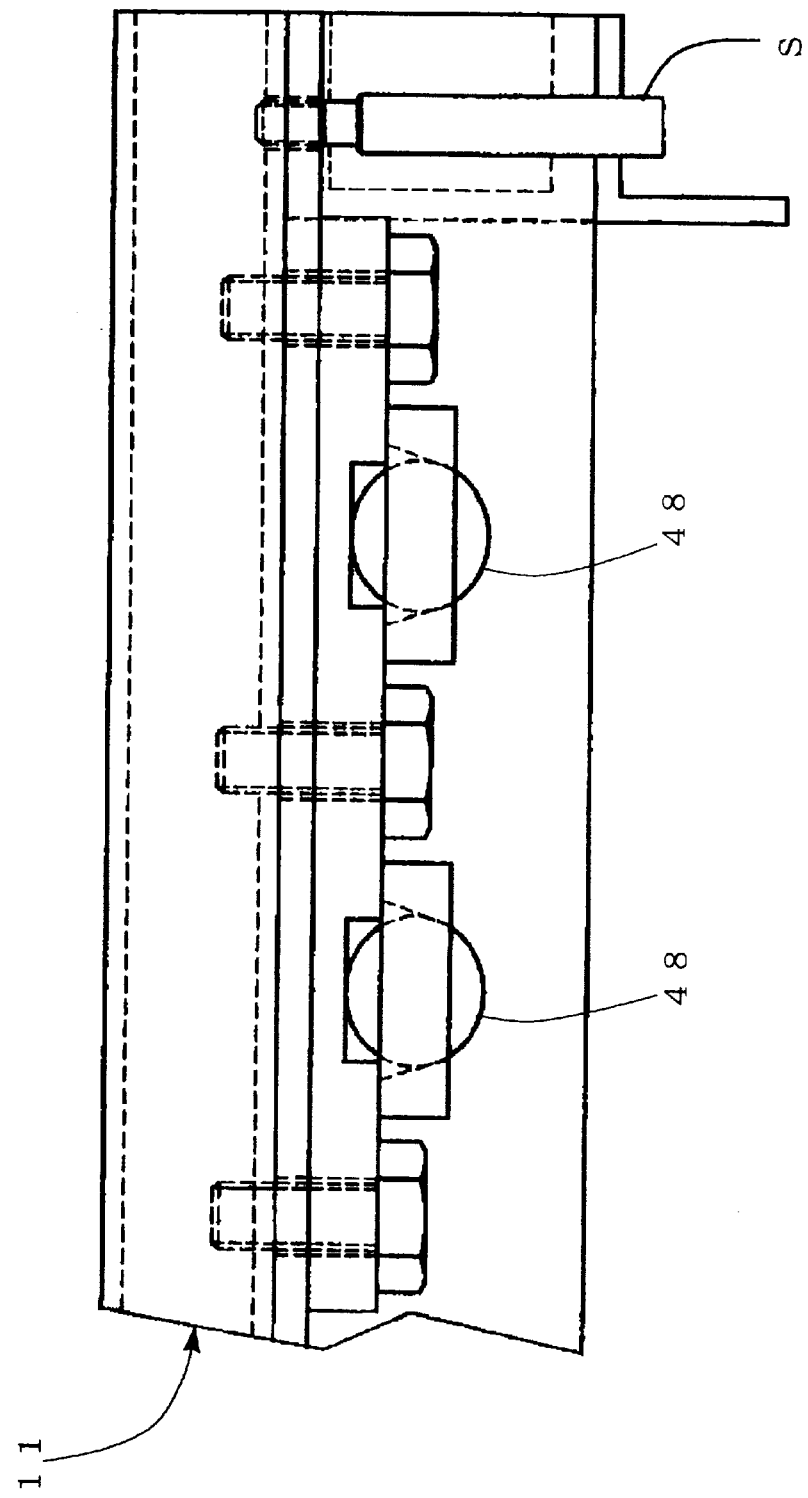
FIG. 16 is a left side view of FIG. 15 being rotated counterclockwise by 90 degrees.
Figure 17:
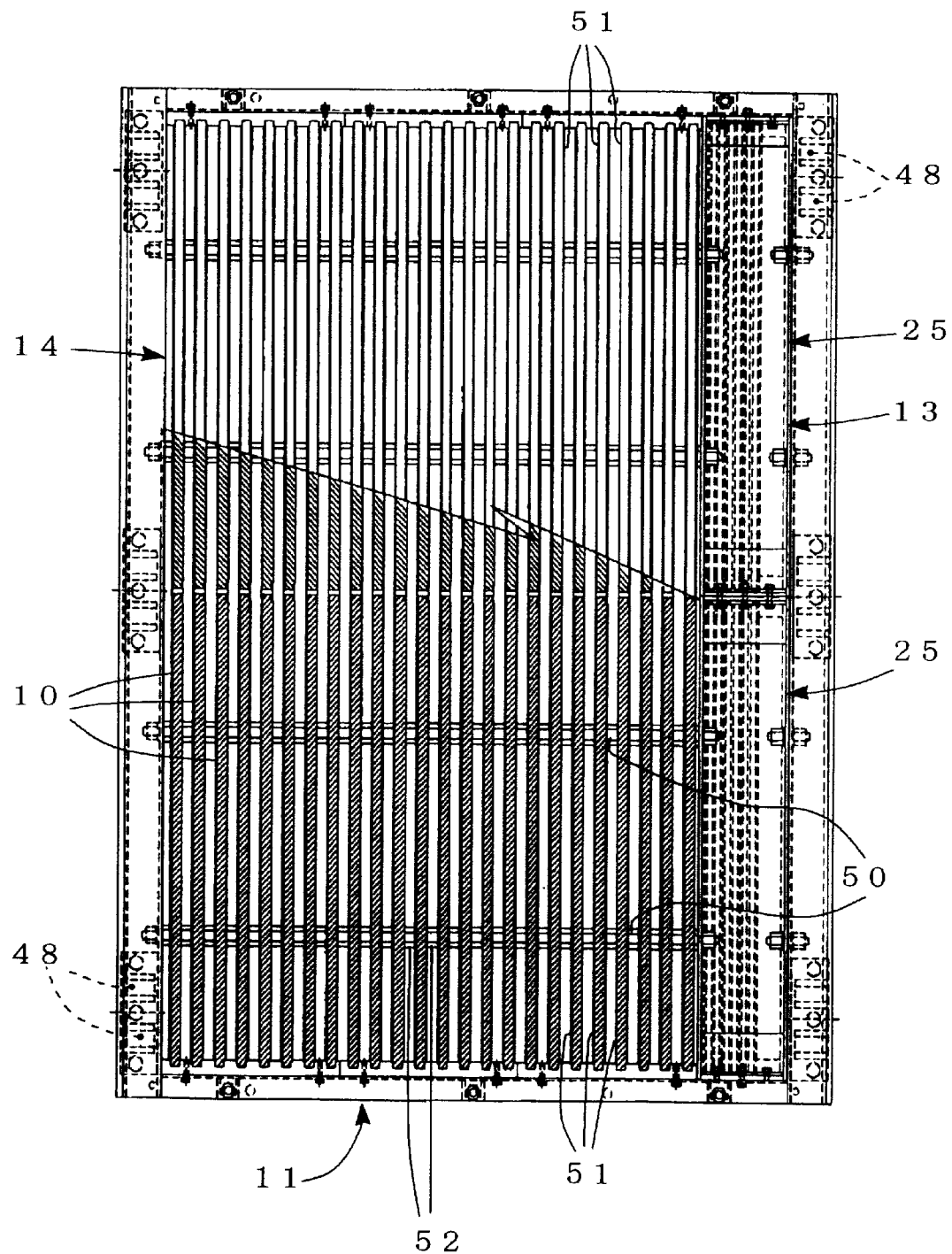
FIG. 17 is a plan view of a cartridge whose under portion shows sheets (10) in section.

In FIGS. 12 and 13, seal panels 16 or 16' are shaped to fit for open surfaces 15 or 15' of the box-like frame units 6 or 6' shown in FIG. 2, and rim portions 34 or 34' are fixed to the box-like frame units 6 or 6' by rivets 35 so as open surfaces 15 or 15' are sealed.

In this case, the seal panels 16 or 16' are easily fixed to the box-like frame units 6 or 6', and the open surfaces 15 or 15' are sealed in airtight condition by simple way.

Outer surfaces of the seal panels 16 or 16' are covered by outer wall panels 37 or 37' fixed to the box-like frame units 6 or 6' with heat insulator 36 or 36' provided on its inner surface.

In this case, because temperature is restrained from changing at inside of the box-like frame units 6 or 6' by the outer wall panels 37 or 37' with the heat insulator 36 or 36', living environment for the microorganisms is kept ideal and the gas is effectively deodorized.

Outer wall panels 37 or 37' are fixed to the box-like frame unit 6 or 6' by binders 38, and the binder 38 is made of plastic, has fins 40 at one end of a stem 39, and has an inner head portion 41 and an outer head portion 42 at the other end. Then, length L4 between the inner head portion 41 and outer head portion 42 fits for thickness of a round frame 43 or 43' of the outer wall panel 37 or 37', while outer diameter D4 of the outer head portion 42 is smaller than inner diameter D3 of a circular potion 45 of a keyhole 44 perforating through the round frame 43 or 43' on inner face of the outer wall panel 37 or 37', and inner length L5 of a lock portion 46 which continues to the circular portion 45 is smaller than outer diameters D2 or D4 of the inner head portion 41 or the outer head portion 42. The fins 40 are elastically deformed and allow the stem 39 to be pressed into a through hole 47 perforating through the box-like frame units 6 or 6'.

In this case, after hooking the binders 38 temporally at the lock portions 46 of the keyholes 44 of the round frame 43 or 43' by its inner and outer head portions 41 and 42 and putting the outer wall panel 37 or 37' on outer surface of the seal panel 16 or 16', by hitting outer surface of the outer wall panel 37 or 37' as placing the top edges of the stems 39 of the binders 38 at through holes 47, the binders 38 are driven into the through holes 47, and the fins 40 pass deforming elastically through the through holes 47. After passing the through holes 47, the fins 40 are returned to its original states, and the outer wall panel 37 or 37' are prevented from falling off the box-like frame unit 6 or 6'. Therefore, outer wall panel 37 or 37' is easily and certainly fixed at the box-like frame unit 6 or 6'.

In FIGS. 14 to 17, the cartridge 11 is placed across inside of the box-like frame unit 6 being pulled out free by placing rollers 48 of the outer frame 9 on horizontal guides 49 at the box-like frame units 6. It is preferable to provide stoppers S which contact on side edges of the guides 49 so as the cartridge 11 is prevented from meandering between the guides 49.

In this case, because the cartridge 11 is slid into and out the box-like frame unit 6 in horizontal direction, top portion of the apparatus can be located close to ceiling without causing any problem. Further, because of rollers 48, even heavy cartridge 11 can be easily slid into and out.

In FIGS. 14, and 17 to 19, supporting rods 50 are placed across the cartridge 11 at its top and bottom portions at right angles to the blow-in surface 14, and several sheet receivers 51 being supported by spacers 52 are placed along the supporting rods 50. Then the sheets 10 are supported by own top and bottom edges tightly inserted respectively into each of the sheet receivers 51 facing each other at top and bottom.

In this case, because of being supported by sheet receivers 51, the sheets 10 are stable without flapping in condition pressured by wind and ensure keeping space their between. Therefore deodorizing efficiency is improved.

Figure 19:
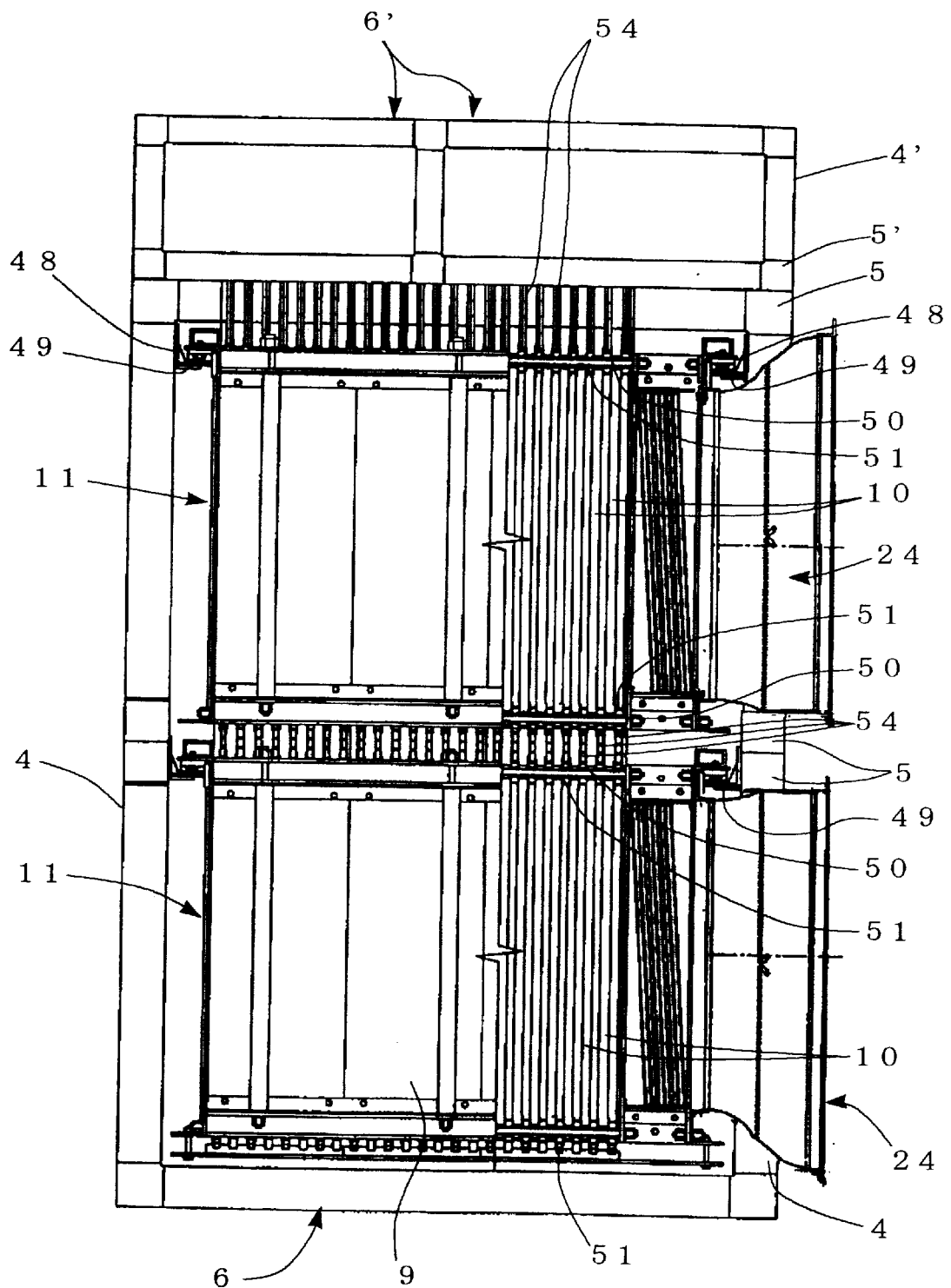
FIG. 19 is a partially cut off side view of two stages type cartridge for explanation of partition members (54)

In FIGS. 18 and 19, above the cartridge 11, the apparatus has partition members 54 which is tightly inserted into grooves 53 on each top side of the sheet receivers 51 and stretch along each of the sheet receivers 51 and whose top edge portions are close to a source of flow water.

In this case, water is uniformly supplied to the sheets 10 and good condition for growth of microorganisms can be kept.

Figure 20:
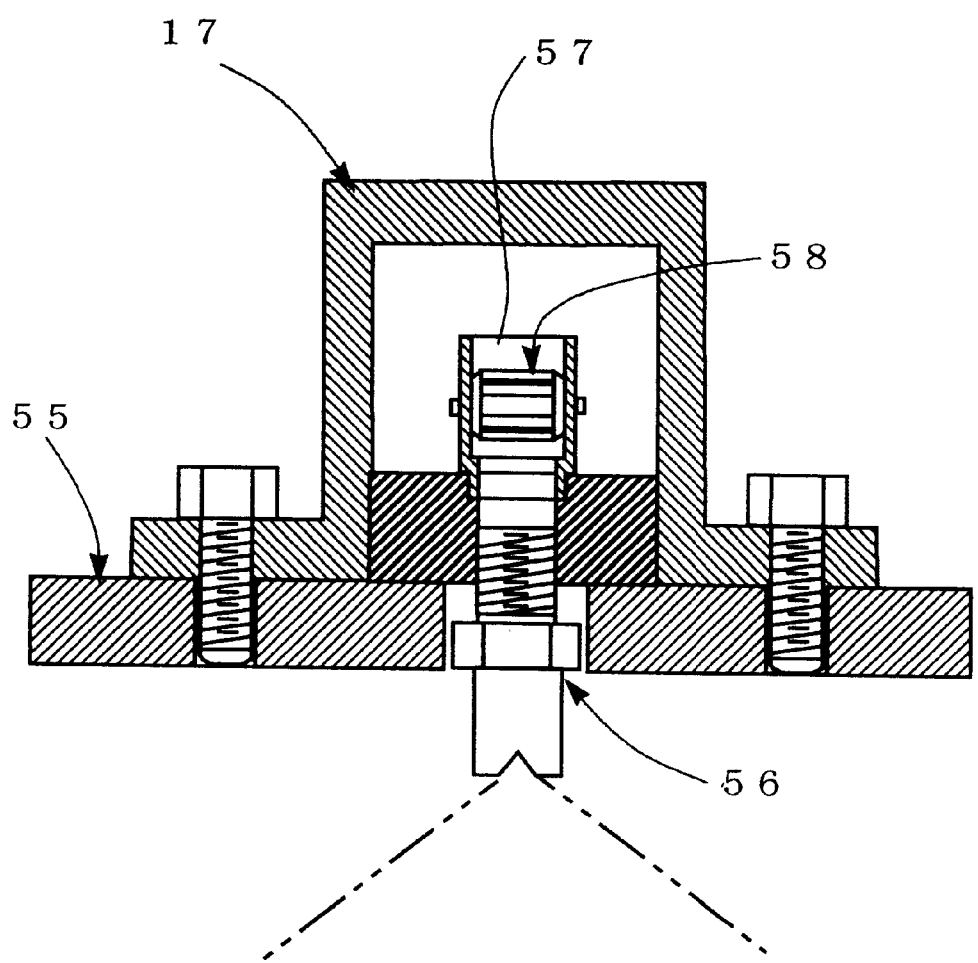
FIG. 20 is a detailed sectional view of a nozzle header (17) for explanation of case where rotor blades (58) are provided.
Figure 21:
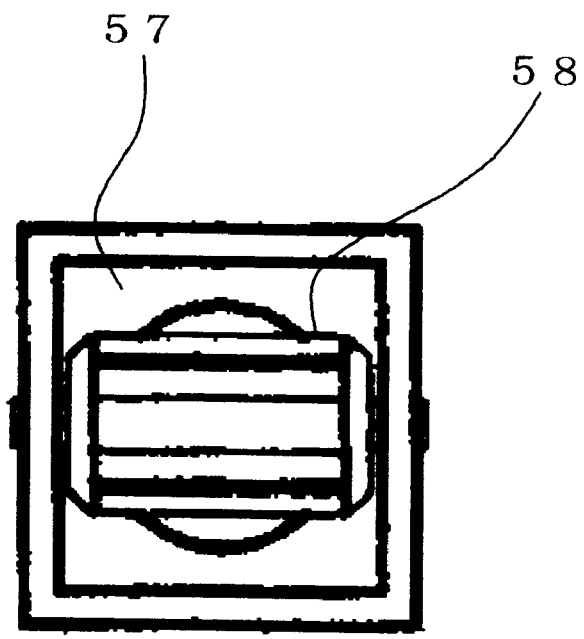
FIG. 21 is an extended plan view of a part of rotor blades (58).

In FIGS. 20 and 21, the nozzle header 17 is made of transparent materials and, at ceiling panel 55 overlaid upper surface of top located the cartridge 11, fixed covering nozzle 56 fixed through the ceiling panel 55, and rotor blades 58 rotate by water flow are placed across opening portion 57 of the nozzle 56 at side near to the nozzle header 17.

In this case, because the rotor blades 58 stop rotating as water stops flowing, it can be visually checked whether water flows or not and operating condition of the apparatus can be easily inspected.

EXAMPLE

According to the apparatus of present invention, for malodorous materials such as hydrogen sulfide or organic sulfuric compounds which cause at a sewage treatment place, it is verified through a result of demonstration that practical layouts of deodorizing system can be achieved without causing any problem by integrating to only two kind of large cartridges each of which includes, for example, 24 and 32 sheets.

Odor causes at a sewage treatment place is ordinary classified to low density type causes at activated sludge tank where water is treated, middle density type causes at the equipment where swage flows in and is removed dust or at first settling basin, and high density type causes at concentrating tank where swage is treated or at dryer. Caused malodorous materials and density of each type is as follow (table 2).

TABLE 2

| | (ppm) | | | |
|---|---|---|---|---|
| | $H_2S$ Hydrogen sulfide | $CH_3SH$ Methyl mercaptane | $(CH_3)_2S$ Methyl sulfide | $(CH_3)_2S_2$ Methyl disulfide |
| Low density type | 0.6 | 0.07 | 0.04 | 0.005 |
| Middle density type | 4.5 | 0.50 | 0.15 | 0.05 |
| High density type | 30 | 3.0 | 0.40 | 0.40 |

It is found out that, for each of density types described above, designing the cartridge wherein the number of sheets contained is two types of 24 sheets and 32 sheets enables to construct box-like frame units which is practical for all of type, low, middle, and high density type.

According to this layout, the odor is removed to the level where no odor pollution occurs after treating. Then, in this layout, removal ratio of hydrogen sulfide per one sheet is from 12 to 13 percent, and removal ratio of mercaptane is from 10 to 11 percent.

Two types of structures of cartridges and types of microorganisms fixed in cartridges at practical example are described below.

Low density type: 24 sheets cartridge (for H2S)→32 sheets cartridge (for R—S)
Middle density type: 24 sheets cartridge (for H2S)→32 sheets cartridge (for H2S+R—S)→32 sheets cartridge (for R—S)
High density type: 24 sheets cartridge (for H2S)→32 sheets cartridge (for H2S)→32 sheets cartridge (for R—S)→32 sheets cartridge (for R—S)
*R—S represents organic sulfuric compounds such as CH3SH, (CH3)2S, (CH3)2S2

By determining to use only two types of large cartridges, the concept of the method using standard module for apparatus is in effect. Then the frame construction of main body of the deodorizing apparatus is simplified, especially size along to the direction of length can be shorten, minimizing the apparatus in size can be achieved. Further, according to amount of gas to be treated, in both side (width) and length (height) directions, required number of cartridges can be freely choose and arranged to suite for the construction site.

With angular pipes (75 mm×75 mm) made of FRP and two kind of plastic joints made by ejected molding, a frame body of the deodorizing apparatus is constructed. Top stage of the apparatus is, to keep a space for box contains nozzle to wash sheets, similarly constructed with angular pipes (50 mm×50 mm) one size smaller than the pipes for main body and two kind of plastic joints made by ejected molding. To the purpose of simplified work at the construction site, frames having capacity of containing several cartridges preferably constructed in factory beforehand and connected by bolts at the construction site.

The chamber where gas flow in at front stage of the apparatus and the chamber where gas flow out at rear stage of the apparatus are also, as same as frames to contain cartridges, preferably constructed in factory as proper parts, while it is also possible to construct all of its body from beginning to the end at the construction site. Body parts constructed in factory can be easily assembled into a hexahedron box-like shape by connecting with bolts.

The apparatus can be transported from factory to the construction site as a final product in the case where its size is under loading capacity of ordinary truck or trailer. In the case where its size over the loading capacity, it can be transported as parts properly divided and constructed at the construction site.

Because number of types of parts made by molding with FRP to use for ceiling, wall, or floor of apparatus is decreased and their size is also made to be smaller, parts cost is reduced. Further, it can be easily handled. Combination of several blocks constructed with angular pipes in box-like shape enables to assemble apparatus of any size being added in lengthwise and breadthwise. As described above, by minimizing parts in size and method of standardized module, stock amount and product costs are drastically reduced.

Reasons and methods for sliding the cartridge into and out the apparatus at its side.

Because pores (spaces) of sheets cultivated with microorganisms in factory is filled with full water and weight of one cartridge containing sheets is very heavy being 230 kg to 280 kg, a ceiling crane is required to load the cartridge into the apparatus through top portion.

Ordinary, deodorizing apparatus is installed indoors, and normal length (height) under beam of the equipment is 6.5 m to 7 m. Therefore, when a deodorizing apparatus having large capacity such as several hundreds cubic meter per minute is installed, there is no space left for installing a crane above the apparatus.

However, on one of sides of apparatus, a pass way for inspection is made. Then, utilizing the pass way, the cartridge can be safely and easily slid into or out by using a truck crane or a lift with wheel.

To slide the cartridges into and out the apparatus at its side, both sides of the box-like frame units are provided with rails to support the cartridge, while the cartridge is provided with hanging rails having rollers to enable smooth drive on the rails.

Ordinary biological deodorizing apparatus using filled tower method is said to require 6 months to 1 year or longer term to culture microorganisms at the construction site. Then, during the culturing term, there are serious problems of not only discharging incompletely treated gas with odor, but also spending huge culturing maintenance cost for long period.

Comparing to such filled tower method where carriers made of ceramics, resins, or activated carbons are used, sheets determined their pore size enable to take a method of collective microorganism fixing in high density in the sheets in cultural device of factory according to classification of three typical malodorous materials of ammonia, hydrogen sulfide, and organic sulfuric compound with spending long period beforehand.

Therefore, there is a merit of being able to bring its deodorizing effect into work as soon as operation starts. By loading activated sludge liquid in the cultural tank, conditioning temperature to be suitable for existing or culturing, and then supplying microorganisms' food such as hydrogen sulfide and air (oxygen), sheets can be made to contain only microorganisms which is effective for hydrogen sulfide.

Similarly, for organic sulfuric compounds, by supplying mercaptane sodium and air (oxygen), sheets can be made to contain effective microorganisms only.

Overall surface of the sheets is, at even intervals of 50 mm in lengthwise and breadthwise, provided with bullet shape holes whose diameter is 6.5 mm and depth is about 8 mm, and the holes are to be plugged by beads (made of as same material as sheets). The beads are always kept in cultural device and microorganisms are collectively fixed in them at high density. Namely, they correspond to germ seeds. In the case where sheets having no beads are took into the cultural device, about one month is required as culturing term before use. However, the sheets plugged with the beads can be carried into the construction site in 7 days, and culturing term can be reduced to one forth. According to this fact, it is clear that the pores in sheets continue and microorganisms culture and spread from inside of sheets.

Adopted is a control system wherein pH of washing drain is automatically measured and starting timing of next washing is controlled according to the measured value.

<The Washing Operation and its Steps>

1. Sheet washing is operated for each of the cartridge box-like frame units respectively, and each of columns is washed in series of lengthwise. Subjecting to washing command for each of the cartridge box-like frame units, washing pump is started, the motor operated valve of the first column is full opened, and then washing is started.

After fixed time (5 to 10 minutes) passed, washing of the first column is finished and the motor operated valve is full closed, while another motor operated valve of the second column is full opened and washing of the second column is started. In same way, washing proceeds to the third column, fourth column and to next other columns, and when washing of last column is finished one cycle of washing the box-like frame unit is finished.

As described above, washing operation for each column enables to make cartridges not being washed treat the gas, so that amount of gas treating is not decreased though pressure loss increases and treating effect downs in same degree.

2. Command of washing and control

At the washing of box-like frame units, basically at 2 to 2.5 minutes after from start of washing of the second column, pH of washing drain is measured by pH meters set at draining pipes independently equipped for each box-like frame unit, and the pause to next washing command is automatically settled based on the measured value.

To give an example, in the case of the box-like frame units for removing hydrogen sulfide, because of proper range of pH is 3.0 to 3.5, if pH measurement is 4.0 being over the upper limit 3.5 of proper range, time interval to next washing can be extended by 0.5 hour. On the other hand, if pH measurement is 2.5 being under the lower limit 3.0, time interval to next washing can be shortened by 0.5 hour.

Therefore, it is possible to maintain activation of microorganisms existing at every sheet in cartridges, and to achieve stable deodorizing effect.

By the way, in the case of the box-like frame units for removing organic sulfuric compounds, having proper range of pH from 5.5 to 6.0, if pH measurement is over the upper limit 6.0, time interval to next washing can be extended by 0.5 hour, while being under the lower limit 3.0, shortened by 0.5 hour similarly as described above. Namely, applied is the system wherein washing interval is controlled according to density change for each malodorous material treated by the deodorizing box-like frame unit.

<Insulation by Double Wall Construction>

The apparatus has double wall construction. Overall of inner wall, front, back, both side, draining floor and ceiling are formed with standardized parts made of FRP and kept in pressure resistant airtight condition, so that gas is prevented from leaking outside.

At the outer wall, several types of standard panels made of plastic are used considering weather resistance and simply fixed by unique shape binders made of nylon resins. In the space between inner and outer wall, heat insulators are filled to maintain living environment of microorganisms in temperature of 15 degrees C to 35 degrees C during four seasons.

<Activated Carbon Treating Portion Connectable in Simple Way>

Unless environment of microorganisms is spoiled, biological deodorizing apparatus brings its ability into stable work during four seasons. However, as described above, even the sheets are cultivated with microorganisms in factory beforehand, efficiency is around 50% just after being filled in apparatus, and it is impossible to avoid spending at least one month to brings its ability into its maximum after cultivated by new odor materials. Therefore, to make assurance double sure, the activated carbon treating portion is connected so as simply preventing odor from being discharged during culturing term. After biological deodorizing apparatus start to work normally, regulation base of prevent odor low is satisfied, so that gas is discharged without passing activated carbon.

Effects of the Invention

According to present invention, each of frames of inlet portion, treating portion and outlet portion is composed of one or more same box-like frame units constructed by connecting uniformly shaped frame members and at least one type of uniformly shaped joints. So that only connecting required number of said box-like frame units according to type, amount and density of the gas etc., apparatus of size having enough treating capacity can be constructed. Further, inside of box-like frame is kept in airtight condition, so that gas does not leak outside without being treated. Furthermore, the cartridges of treating portion slide into and out box-like frame unit at its side, so that no space is required above the apparatus and therefore occupied area is reduced by rising height. Furthermore, frame members and joints of each box-like frame unit of apparatus are standardized as modules, so that by constructing the box-like frame units at factory and connecting the box-like frame units at the construction site, production and transportation cost are drastically reduced.

According to claim 2, said outlet portion follows auxiliary treating device having an activated carbon treating portion and a second outlet portion, and is to be connected to or shut off from said auxiliary treating device as said gas outlet opening opens or closes, so that by closing the outlet opening at early operating stage where biological activation is not enough achieved, malodorous gas can be treated by the activated carbon through the auxiliary treating device, and incomplete treating can be avoided.

According to claim 3, said blow-off surface and said blow-in surface are connected by a hood in airtight condition, so that inside of the blow-off surface and the blow-in surface can be easily kept in airtight condition.

According to claim 4, said blow-off surface belongs to a demister cartridge fixed at said cartridge and the cartridge and the demister cartridge are in one body, so that they are easily slid into and out box-like frame units and washing water being flowed on sheets does not scatter to next cartridge or outlet portion. So it is preferable.

According to claim 5, said hood consists of a portion for blow-off surface and a portion for blow-in surface, both portions are detachably connected by a fastener and the hood splits to a portion for blow-off surface and a portion for blow-in surface, so that setting to each portion is easily achieved and they are easily combined in one body by the fastener According to claim 6, said portion for blow-in surface is, at its rim portion on the other side of said fastener, fixed with respect to said frame members forming one of said open surfaces of said box-like frame unit, so that the portion for blow-in surface is fixed at the frame members and it is easily connected to the portion for blow-off surface. Enough airtight condition is also achieved.

According to claim 7, said frame member is plastic square tube whose ends of inner space function as joint portions, so it can be made at low cost and easily molded. Then its ends can be used as joint portions.

According to claim 8, said joint is made of plastic and portions to be jointed with said joint portion of said frame member protrude from each of two or more adjacent surfaces of rectangular hexahedron main body so as each of axes are at right angles to each other, so it can be made at low cost and easily molded. Then it enables to connect each frame members vertically.

According to claim 9, said portion to be jointed is regular octahedron protrude whose one or more pairs of facing surfaces parallel a pair of facing surfaces of said joint and length between facing surfaces of said regular octahedron protrude fits for inner length of said joint portion, so that a regular octahedron protrude is tightly inserted into an angular hall, it is easily inserted and tight contacting condition can be achieved.

According to claim 10, said portion to be jointed is cylindrical protrude whose outer diameter fits for inner length of said joint portion of said frame member, so that a cylinder is tightly inserted into an angular hole and their connecting condition is not obstructed by dimensional error in some degree.

According to claim 11, said portion to be jointed is square columnar protrude which is tightly inserted into said joint portion of said frame member, so it can be connected very tightly and resistance to vibration of earthquake is improved though it is difficult to mold in some extent.

According to claim 12, said seal panel is shaped to fit for said open surface of said box-like frame unit, and rim portion is fixed to said box-like frame unit by rivets so as said open surface is sealed, so that the seal panel is easily fixed to the box-like frame units and the open surface is sealed in airtight condition by simple way.

According to claim 13, an outer surface of said seal panel is covered by an outer wall panel fixed to said box-like frame unit with heat insulator provided on its inner surface, so that temperature is restrained from changing at inside of the box-like frame unit by the outer wall panel with heat insulator, living environment for microorganisms is kept ideal, and gas is effectively deodorized.

According to claim 14, said outer wall panel is fixed to said box-like frame unit by binders, this binder is made of plastic, has fins at one end of a stem and has an inner head portion and an outer head portion at the other end, length between these inner and outer head portions fits for thickness of a round frame of said outer wall panel, while outer diameter of said outer head portion is smaller than inner diameter of a circular potion of keyhole perforating through the round frame on inner surface of said outer wall panel, and inner length of a lock portion which continues to said circular portion is smaller than outer diameters of said inner and outer head portion, the fins are elastically deformed and allow said stem to be pressed into a through hole perforating through said box-like frame units. So that after hooking the binders temporally at the lock portions of the keyholes of the round frame by its inner and outer head portions and putting the outer wall panel on the outer surface of the seal panel, by hitting the outer surface of the outer wall panel as placing the top edges of the stems of the binders at the through holes, the binders are driven into the through holes, and the fins pass deforming elastically through the through holes. After passing the through holes, fins are returned to its original states, and outer wall panel is prevented from falling off the box-like frame unit. Therefore, the outer panel is easily and certainly fixed at box-like frame unit.

According to claim 15, said cartridge is placed across inside of said box-like frame unit being pulled out free by placing rollers of said outer frame on horizontal guides provided at said box-like frame unit, so that the cartridge is slid into and out the box-like frame unit in horizontal direction and top portion of the apparatus can be located close to ceiling without causing any problem. Further, because of the rollers, even heavy cartridge can be easily slid into and out.

According to claim 16, supporting rods are placed across said cartridge at its top and bottom portions at right angles to said blow-in surface, several sheet receivers are placed across and carried by said supporting rods with spacers between the sheet receivers, and said sheets are supported by own top and bottom edges tightly inserted respectively into each of said sheet receivers facing each other at top and bottom, so that sheets are stable without flapping in condition pressured by wind and ensure keeping space their between. Therefore deodorizing efficiency is improved.

According to claim 17, above said cartridge, the apparatus has partition members which is tightly inserted into grooves on top side of said each sheet receivers and stretch along said sheet receivers and whose top edge portions are close to a source of flow water, so that water is uniformly supplied to the sheets and a good condition for growth of microorganisms can be kept.

According to claim 18, said nozzle header is made of transparent materials and, at ceiling panel overlaid upper surface of top located said cartridge, fixed covering nozzles fixed through said ceiling panel, and rotor blades rotate by water flow are placed across opening portions of said nozzles at side near to said nozzle header, so it can be checked visually if water stops flowing and operating condition of the apparatus can be easily inspected:

What is claimed is:

1. A biological deodorizing apparatus assembled with box-shaped frame units having an inlet portion (1) for malodorous gas, at least one treating portion (2) and an outlet portion (3) in a series in a gas channel, and biologically deodorizing gas in said treating portion (2), and wherein;

each of frames of said inlet portion (1), said treating portion (2) and said outlet portion (3) is composed of at least one rectangular hexahedron box-shaped frame units (6) constructed by connecting frame members (4) and joints (5);

said inlet portion (1) is provided with a gas inlet opening (7) and a humidifier (8);

said treating portion (2) is composed of a preselected number of said box-shaped frame units (6) containing cartridges (11) which can be pulled out free in a horizontal direction and whose outer frames (9) are set by several porous plastic sheets (10) in parallel with each other at a distance;

said outlet portion (3) is provided with a gas outlet opening (12);

said preselected number of said box-shaped frame units (6) are selected and connected according to type, amount and density of the gas;

said treating portion (2)'s blow-off surfaces (13) located upstream on said gas channel is connected to downstream located blow-in surfaces (14) in an airtight condition;

open surfaces (15) of said box-shaped frame units (6) being obstructive of gas treating are sealed with seal panels (16);

said gas inlet opening (7) is connected to a source of the malodorous gas;

said gas outlet opening (12) is opened to outside air;

on said treating portion (2) nozzle headers (17) are placed and connected to water supply pipes (18); and below said inlet portion (1), said treating portion (2) and said outlet portion (3) receiving plates (19) are placed and connected to water draining pipes (20).

2. The biological deodorizing apparatus assembled with box-shaped frame units as claimed in claim 1, wherein said outlet portion (3) follows an auxiliary treating device (23) having an activated carbon treating portion (21) and a second outlet portion (22), and is connected to or shut off from said auxiliary treating device (23) as said gas outlet opening (12) opens or closes.

3. The biological deodorizing apparatus assembled with box-shaped frame units as claimed in claim 1 or 2, wherein said blow-off surface (13) and said blow-in surface (14) are connected by a hood (24) in an airtight condition.

4. The biological deodorizing apparatus assembled with box-shaped frame units as claimed in claim 3, wherein said blow-off surface (13) belongs to a demister cartridge (25) fixed at said cartridge (11).

5. The biological deodorizing apparatus assembled with box-shaped frame units as claimed in claim 3, wherein said hood (24) consists of a portion (24a) for said blow-off surface and a portion (24b) for said blow-in surface, and both portions (24a, 24b) are detachably connected by a fastener (26).

6. The biological deodorizing apparatus assembled with box-shaped frame units as claimed in claim 5, wherein said portion (24b) for blow-in surface is, at its rim portion (24c) located on a downstream side of said fastener (26), fixed with respect to said frame members (4) forming one of said open surfaces (15) of said box-shaped frame unit (6).

7. The biological deodorizing apparatus assembled with box-shaped frame units as claimed in claim 1, wherein said frame member (4) is a plastic square tube (27) whose ends comprise joint portions (28).

8. The biological deodorizing apparatus assembled with box-shaped frame units as claimed in claim 1, wherein said joint (5) is made of plastic end portions (30) to be joined with said joint portions (28) of said frame member (4) which protrude from each of two or more adjacent surfaces of rectangular hexahedron main body (29) so that each of axis is at right angles to each other.

9. The biological deodorizing apparatus assembled with box-shaped frame units as claimed in claim 8, wherein said end portion (30) to be joined is a regular octahedron protrusion (31) whose one or more pairs of facing surfaces (31a, 31b) parallel a pair of facing surfaces (5a, 5b) of said joint (5) and length (L1) between the facing surfaces of said regular octahedron protrusion (31) fits into inner length (L2) of said joint portion (28).

10. The biological deodorizing apparatus assembled with box-shaped frame units as claimed in claim 8, wherein said end portion (30) to be joined is a cylindrical protrusion (32) whose outer diameter (D1) fits into inner length (12) of said joint portion (28) of said frame member (4).

11. The biological deodorizing apparatus assembled with box-shaped frame units as claimed in claim 8, wherein said end portion (30) to be joined is a square columnar protrusion (32) which is tightly inserted into said joint portion (28) of said frame member (4).

12. The biological deodorizing apparatus assembled with box-shaped frame units as claimed in claim 1, wherein said seal panel (16) is shaped to fit into said open surface (15) of said box-shaped frame unit (6), and a rim portion (34) is fixed to said box-shaped frame unit (6) by rivets (35) so that said open surface (15) is sealed.

13. The biological deodorizing apparatus assembled with box-shaped frame units as claimed in claim 1 or 12, wherein an outer surface of said seal panel (16) is covered by an outer wall panel (37) fixed to said box-shaped frame unit (6) with heat insulator (36) provided on its inner surface.

14. The biological deodorizing apparatus assembled with box-shaped frame units as claimed in claim 13, wherein:

said outer wall panel (37) is fixed to said box-shaped frame unit (6) by binders (38), said binders (38) are made of plastic, have fins (40) at one end of a stem (39), and have an inner head portion (41) and an outer head portion (42) at the other end, length (L4) between said inner and outer head portions (41, 42) fits into a thickness of a round frame (43) of said outer wall panel (37), while outer diameter (D4) of said outer head portion (42) is smaller than inner diameter (D3) of a circular portion (45) of a keyhole (44) perforating through the round frame (43) on inner surface of said outer wall panel (37), inner length (L5) of a lock portion (46) which continues to said circular portion (45) is smaller tan outer diameters (D2, D4) of said inner and outer head portions (41, 42), and said fins (40) are elastically deformed and allow said stein (39) to be pressed into a through hole (47) perforating through said box-shaped frame units (6).

15. The biological deodorizing apparatus assembled with box-shaped flame units as claimed in claim 1, wherein said cartridge (11) is placed across inside of said box-shaped frame unit (6) to be pulled out freely by placing rollers (48) of said outer frame (9) on horizontal guides (49) provided at said box-shaped frame unit (6).

16. The biological deodorizing apparatus assembled with box-shaped frame units as claimed in claim 1 or 15, wherein:

supporting rods (50) are placed across said cartridge (11) at its top and bottom portions at right angles to said blow-in surface (14), several sheet receivers (51) are placed across and cried by said supporting rods (50) with spacers (52) between the sheet receivers, and said sheet (10) is supported by own top and bottom edges tightly inserted respectively into each of said sheet receivers (51) facing each other at top and bottom.

17. The biological deodorizing apparatus assembled with box-shaped frame units as claimed in claim 16, wherein above said cartridge (11) are provided partition members (54) which are tightly inserted into grooves (53) on each top side of said sheet receivers (51) and stretch along said sheet receivers (51) and whose top edge portions are close to a source of flow water.

18. The biological deodorizing apparatus assembled with box-shaped frame units as claimed in claim 1, wherein said nozzle header (17) is made of transparent materials and, at ceiling panel (55) overlaying an upper surface located above said cartridges (11), fixed covering nozzles (56) are fitted trough said ceiling panel (55), and rotor blades (58) rotated by water flow are arranged so that each of their axes of rotation is placed across opening portions (57) of said nozzles (56) at a side near to said nozzle header (17).

19. The biological deodorizing apparatus assembled with box-shaped frame units as claimed in claim 4, wherein said hood (24) consists of a portion (24a) for said blow-off surface and a portion (24b) for said blow-in surface, and both portions (24a, 24b) are detachably connected by a fastener (26).

20. The biological deodorizing apparatus assembled with box-shaped frame units as claimed in claim 19, wherein said portion (24b) for said blow-in surface is, at its rim portion (24c) located on the other side of said fastener (26), fixed with respect to said frame members (4) forming one of said open surfaces (15) of said box-shaped frame unit (6).

21. The biological deodorizing apparatus assembled with box-shaped frame units as claimed in claim 6, wherein said frame member (4) is a plastic square tube (27) whose ends comprise joint portions (28).

22. The biological deodorizing apparatus assembled with box-shaped frame units as claimed in claim 19, wherein said frame member (4) is a plastic square tube (27) whose ends comprise joint portions (28).

23. The biological deodorizing apparatus assembled with box-shaped frame units as claimed in claim 20, wherein said frame member (4)is a plastic square tube (27) whose ends comprise joint portions (28).

* * * * *